United States Patent
Yu et al.

(10) Patent No.: US 12,149,167 B2
(45) Date of Patent: Nov. 19, 2024

(54) METHODS, SYSTEMS, AND DEVICES FOR FAULT HANDLING IN A POWER CONVERTER

(71) Applicant: pSemi Corporation, San Diego, CA (US)

(72) Inventors: Tim Wen Hui Yu, Fremont, CA (US); Gregory Szczeszynski, Nashua, NH (US)

(73) Assignee: pSemi Corporation, San Diego, CA (US)

(*) Notice: Subject to any disclaimer, the term of this patent is extended or adjusted under 35 U.S.C. 154(b) by 235 days.

(21) Appl. No.: 17/933,559

(22) Filed: Sep. 20, 2022

(65) Prior Publication Data
US 2024/0097559 A1    Mar. 21, 2024

(51) Int. Cl.
*H02M 3/158* (2006.01)
*H02M 1/32* (2007.01)

(52) U.S. Cl.
CPC ........... *H02M 1/325* (2021.05); *H02M 1/327* (2021.05); *H02M 3/1584* (2013.01)

(58) Field of Classification Search
CPC .... H02M 3/1582; H02M 3/156; H02M 3/157; H02M 3/158; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588;
(Continued)

(56) References Cited

U.S. PATENT DOCUMENTS 6,301,133 B1 * 10/2001 Cuadra ................... H02J 1/102
                                                             363/65
7,443,055 B2 * 10/2008 Pracht ...................... H02J 1/001
                                                             307/64
(Continued)

*Primary Examiner* — Jeffrey A Gblende
(74) *Attorney, Agent, or Firm* — Haynes and Boone, LLP

(57) ABSTRACT

Disclosed embodiments may include a power converter system with fault handling. Embodiments may include first and second power converters each including an output terminal and a control terminal, the first and second power converters to regulate voltage or current at their respective output terminals based on a voltage at their respective control terminals, the output terminals coupled to each other, and the control terminals coupled to each other; wherein the first power converter comprises: a circuit to detect a fault condition associated with the first power converter and to generate a first fault signal at the control terminal of the first power converter after the detecting the fault condition associated with the first power converter; wherein the second power converter comprises: a circuit to change an operating mode of the second power converter after generating the first fault signal at the control terminal of the first power converter.

22 Claims, 11 Drawing Sheets

(58) Field of Classification Search
CPC .... H02M 7/5395; H02M 1/14; H02M 1/0043; H02J 3/46; H02J 3/38
See application file for complete search history.

(56) References Cited

U.S. PATENT DOCUMENTS

| | | | |
|---|---|---|---|
| 11,545,902 B2 * | 1/2023 | Luo | H02M 3/1584 |
| 2016/0268892 A1 * | 9/2016 | Gupta | H02M 3/07 |
| 2021/0057911 A1 * | 2/2021 | Pieschel | H02J 3/1814 |

* cited by examiner

METHODS, SYSTEMS, AND DEVICES FOR FAULT HANDLING IN A POWER CONVERTER

TECHNICAL FIELD

The present disclosure generally relates to power electronic devices. More particularly, the present disclosure relates to DC-DC power converters.

BACKGROUND

Many electronic products, particularly mobile computing and/or communication products and components (e.g., notebook computers, ultra-book computers, tablet devices, LCD and LED displays), require multiple voltage levels. For example, radio frequency transmitter power amplifiers may require relatively high voltages (e.g., 12V or more), and logic circuitry may require a low voltage level (e.g., 1-2V). Some other circuitry may require an intermediate voltage level (e.g., 5-10V). Power converters are often used to generate a lower or higher voltage from a common power source, such as a battery, in order to meet the power requirements of different components in the electronic products. In many power converter systems, multiple devices can be coupled in parallel and share power delivered by the converter.

SUMMARY

Embodiments of the present disclosure provide apparatuses, systems, and methods for fault handling. In some embodiments, apparatuses, systems, and methods may include a first power converter and a second power converter; the first and second power converters each including an output terminal and a control terminal, the first and second power converters to regulate voltage or current at their respective output terminals based on a voltage at their respective control terminals, the output terminals coupled to each other, and the control terminals coupled to each other; wherein the first power converter comprises: a first detection circuit to detect a fault condition associated with the first power converter, and a first signaling circuit to generate a first fault signal at the control terminal of the first power converter after the first detection circuit detects the fault condition associated with the first power converter; wherein the second power converter comprises: a first fault protection circuit to change an operating mode of the second power converter after the first signaling circuit generates the first fault signal at the control terminal of the first power converter.

In some embodiments, methods may include detecting, via a first detection circuit of a first power converter, a fault condition associated with the first power converter; wherein the first power converter and a second power converter each include an output terminal and a control terminal, the first and second power converters to regulate voltage or current at their respective output terminals based on a voltage at their respective control terminals, the output terminals coupled to each other, and the control terminals coupled to each other; generating, via a first signaling circuit of the first power converter, a first fault signal at the control terminal of the first power converter after the first detection circuit detects the fault condition associated with the first power converter; changing, via a first fault protection circuit of the second power converter, an operating mode of the second power converter after the first signaling circuit generates the first fault signal at the control terminal of the first power converter.

In some embodiments integrated circuits may include a first controller and a second controller; the first and second controller each including an output terminal and a control terminal, the first and second controllers to regulate voltage or current at their respective output terminals based on a voltage at their respective control terminals, the output terminals coupled to each other, and the control terminals coupled to each other; wherein the first controller comprises: a first detection circuit to detect a fault condition associated with the first controller, and a first signaling circuit to generate a first fault signal at the control terminal of the first controller after the first detection circuit detects the fault condition associated with the first controller; wherein the second controller comprises: a first fault protection circuit to change an operating mode of the second controller after the first signaling circuit generates the first fault signal at the control terminal of the first controller.

In some embodiments, apparatuses may include a plurality of power converters, the power converters each including an output terminal and a control terminal, the power converters to regulate voltage or current at their respective output terminals based on a voltage at their respective control terminals, the output terminals coupled to each other, and the control terminals coupled to each other at a common node; wherein each power converter comprises: a detection circuit to detect a fault condition associated with the power converter, a signaling circuit to reduce a voltage of its control terminal below a fault threshold after detecting the fault condition associated with the power converter, and a fault protection circuit to reduce a voltage of its control terminal below a wait threshold after sensing a voltage decrease at the common node.

In some embodiments, a fault handling apparatus may include a plurality of power converters, the power converters each including a detection circuit, a signaling circuit, a fault protection circuit, an output terminal, and a control terminal, the output terminals coupled to each other, and the control terminals coupled to each other at a common node, and a method may include: regulating, via the power converters, voltage or current at their respective output terminals based on a voltage at their respective control terminals; detecting, via the detection circuit of one of the power converters, a fault condition associated with the power converter; reducing, via the signaling circuit of the one of the power converters, a voltage of its control terminal below a fault threshold after detecting the fault condition associated with the power converter, and reducing, via the fault protection circuit of one of the other power converters, a voltage of its control terminal below a wait threshold after sensing a voltage decrease at the common node.

In some embodiments, integrated circuits may include a plurality of controllers, the controllers each including an output terminal and a control terminal, the controllers to regulate voltage or current at their respective output terminals based on a voltage at their respective control terminals, the output terminals coupled to each other, and the control terminals coupled to each other at a common node; wherein each controller comprises: a detection circuit to detect a fault condition associated with a power converter, a signaling circuit to reduce a voltage of its control terminal below a fault threshold after detecting the fault condition associated with the power converter, and a fault protection circuit to reduce a voltage of its control terminal below a wait threshold after sensing a voltage decrease at the common node Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

BRIEF DESCRIPTION OF THE DRAWINGS

Embodiments and various aspects of the present disclosure are illustrated in the following detailed description and the accompanying figures. It is noted that, in accordance with standard practice in the industry, various features may not be drawn to scale. In fact, the dimensions of the various features may be arbitrarily increased or reduced for clarity of discussion.

DETAILED DESCRIPTION

Figure 1:
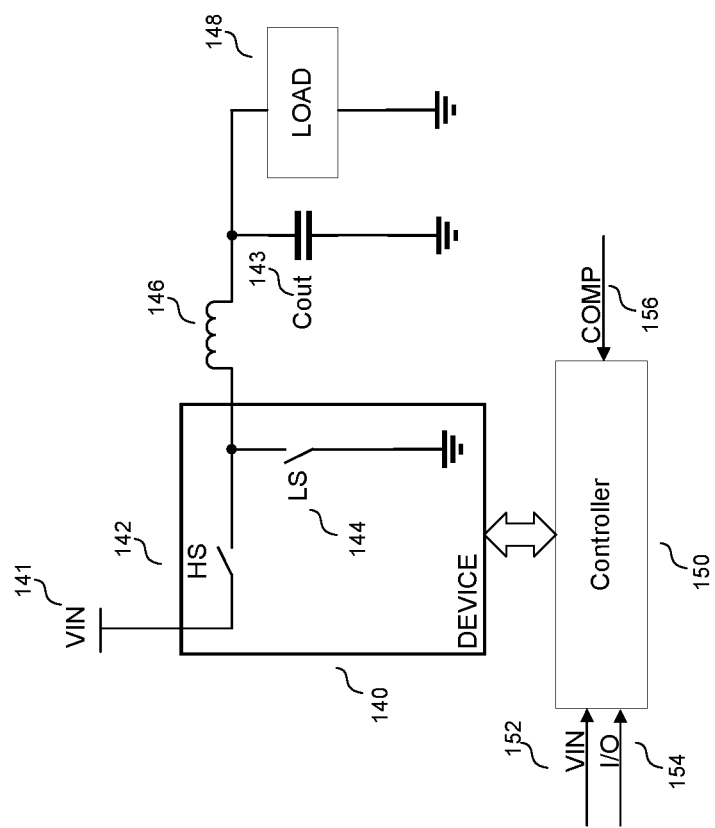
FIG. 1 is a diagram illustrating an example power converter system that may include a power converter, in accordance with embodiments of the present disclosure.

The following disclosure provides many different exemplary embodiments, or examples, for implementing different features of the provided subject matter. Specific simplified examples of components and arrangements are described below to explain the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

In this disclosure, the term "coupled" may also be termed as "electrically coupled", and the term "connected" may be termed as "electrically connected." "Coupled" and "connected" may also be used to indicate that two or more elements cooperate or interact with each other.

In this disclosure, the term "node" may refer to a location within an electrical circuit or system. A node may include, for example, a terminal (e.g., the terminal of a component, such as the drain terminal of a transistor), a location or region along a trace or wire, or the point at which two components are electrically coupled. While a particular location of a node may be described, to the extent that other locations have equivalent electrical properties, such locations may be used. For example, all locations along a trace that are not separated by a resistor may have the same voltage and may be considered the same node for purposes of determining voltage at that location. Similarly, in this disclosure, a terminal may be used to refer to a location in a circuit that may not necessarily include a physical connection point. Terminal may, for example, refer to a node within a circuit.

Throughout this disclosure, embodiments are discussed in relation to particular electrical components, such as capacitors and inductors. Although an individual component may be discussed (e.g., a single capacitor, a single inductor), a combination of multiple components may be substituted for the single component. For example, while a single capacitor may be discussed or depicted, two or more capacitors (e.g., in series, parallel, or a combination of the two) may be substituted so long as the required qualities remain the same. In this example, an embodiment that calls for a single 20 mF capacitor may use two capacitors of 10 mF in parallel instead. Similar substitutions may be made for inductors.

The concepts in the disclosure may also apply, however, to other types of power converters. Power converters which convert a higher input voltage power source to a lower output voltage level are commonly known as step-down or buck converters, because the converter is "bucking" the input voltage. Power converters which convert a lower input voltage power source to a higher output voltage level are commonly known as step-up or boost converters, because the converter is "boosting" the input voltage. In addition, some power converters, commonly known as "buck-boost converters," may be configured to convert the input voltage power source to the output voltage with a wide range, in which the output voltage may be either higher than or lower than the input voltage. In various embodiments, a power converter may be bidirectional, being either a step-up or a step-down converter depending on how a power source is connected to the converter. In some embodiments, an AC-DC power converter can be built up from a DC-DC power converter by, for example, first rectifying an AC input voltage to a DC voltage and then applying the DC voltage to a DC-DC power converter.

Voltage ratings of electrical components, such as capacitors, inductors, and/or transistors, within the power converter may be selected according to actual needs. However, transient over-voltages may occur in the electric system due to the switching off of loads and due to short accelerator tip-ins, which may cause the electrical components to experience temporary over-voltage stress that results in damages to the power electronic devices. In some embodiments, a Metal-Oxide-Semiconductor Field-Effect Transistor (MOSFET) can be used as both the protection switch for preventing undesired power flow, and the voltage standoff device for withstanding a large voltage during the transient over-voltage condition and maintain normal operation of the power converter without triggering an isolation protection.

Disclosed embodiments may include one or more controllers to control, for example, the startup and operation of disclosed embodiments. Controller(s) and control mechanisms may be implemented in various methods including analog control, digital control, and mixed analog and digital control. These control mechanisms can be implemented or integrated within the embodiments themselves or implemented as a microprocessor, a microcontroller, a digital signal processor (DSP), register-transfer level (RTL) circuitry, and/or combinatorial logic.

Disclosed embodiments may include one or more MOSFETs. In embodiments, a MOSFET may refer to any field effect transistor (FET) having an insulated gate whose voltage determines the conductivity of the transistor. In some embodiments, MOSFETS may encompass insulated gates having a metal or metal-like, insulator, and/or semiconductor structure. The metal or metal-like structures may include at least one electrically conductive material (e.g., such as aluminum, copper, other metal, highly doped polysilicon, graphene, or other electrical conductor). The insulator structures may include at least one insulating material (e.g., such as silicon oxide or other dielectric material). The semiconductor structures may include at least one semiconductor material.

Circuits and devices in accordance with the present disclosure may be used alone or in combination with other components, circuits, and devices. Embodiments may be fabricated as integrated circuits (ICs), which may be encased in IC packages and/or in modules for ease of handling, manufacture, and/or improved performance. For example, IC embodiments of the present disclosure may be used in modules in which one or more of such ICs are combined with other circuit components or blocks (e.g., filters, amplifiers, passive components, and possibly additional ICs) into one package. The ICs and/or modules may be then combined with other components, such as on a printed circuit board, to form part of an end product such as a cellular telephone, laptop computer, or electronic tablet, or to form a higher-level module which may be used in a wide variety of products, such as vehicles, test equipment, computing devices, industrial devices, medical devices, etc.

Description of the embodiments of the present disclosure will be provided in detail below with references to the accompanying drawings. Wherever possible, the same reference numbers will be used throughout the drawings to refer to the same or like parts.

FIG. 1 is a diagram illustrating an example power converter system 100 (e.g., power converter systems 200, 300, 400, 500) that may have a power converter (e.g., devices 102, 104, 106, 240a, 240b, 240c). As shown in FIG. 1, power converter system 100 may include a power converter shown as device 140. Device 140 may include a buck converter, a boost converter, a charge pump circuit, or any other types of converter circuits. In various embodiments, power converter system 100 may have different operating ranges for different applications, such as an energy management system in large-scale data centers, a vehicle electrical system in automotive applications, etc.

Power converter system 100 may have a voltage source that provides a voltage VIN 141 to device 140. Device 140 may include a high side switch HS 142 and a low side switch LS 144. In some embodiments, device 140 may provide a voltage to an inductance (e.g., inductor) 146. In some embodiments, power converter system 100 may include a capacitance 143 across a load 148. Inductance 146 and capacitance 143 may together define an LC filter that may output or regulate a voltage that may be provided to load 148.

In some embodiments, device 140 may include switches that need to be opened and closed at certain times. Thus, power converter system 100 may implicitly require one or more controllers 150 to provide control signals that open and close these switches. Controller 150 may include an input/output (I/O) node 154, an input voltage VIN 152, and a compensation/control node COMP 156. Controller 150 may provide a control signal to control switches (e.g., high side switch HS 142 or low side switch LS 144) in device 140. In other embodiments, for example at input/output node 154, the controller may receive other inputs such as input current/output current sensing, output voltage, digital/analog communications, etc.

Figure 2:
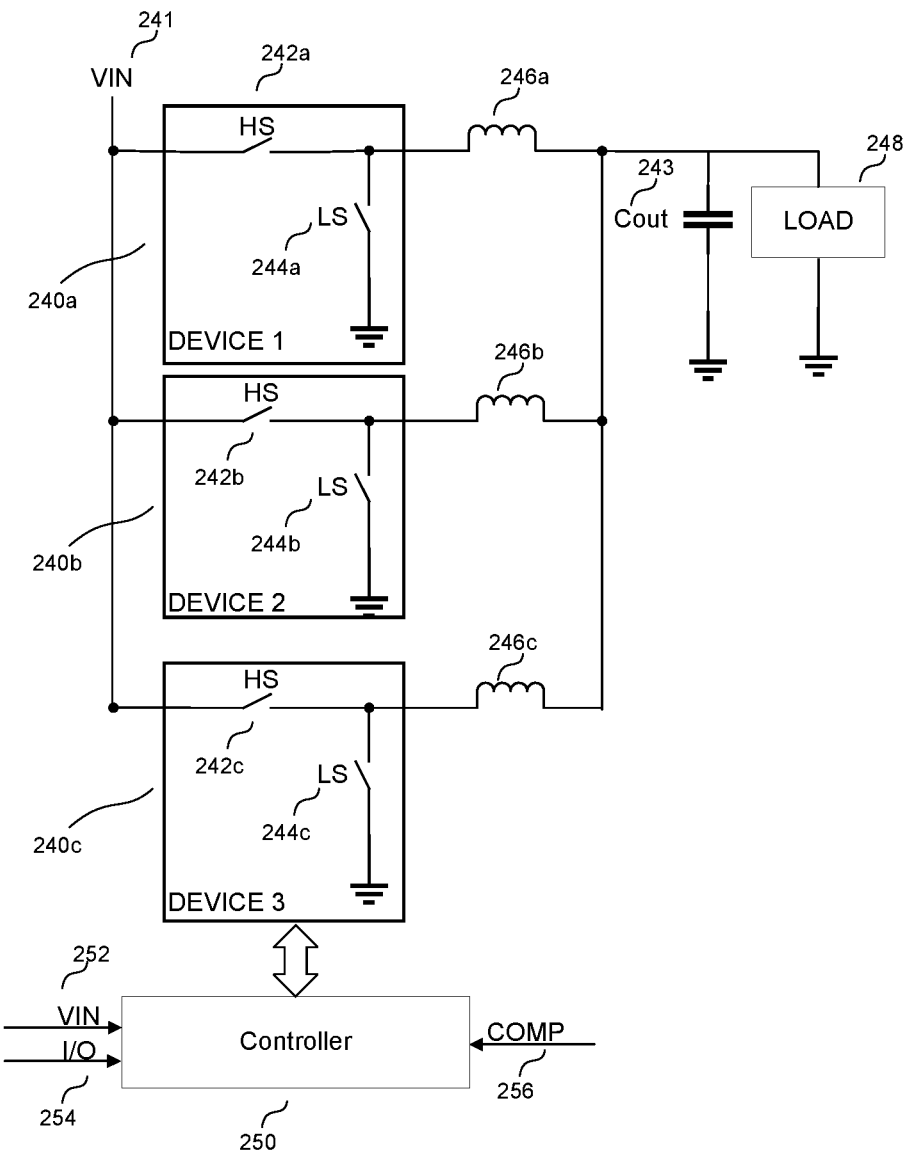
FIG. 2 is a diagram illustrating an example power converter system that may include multiple power converters coupled in parallel, in accordance with embodiments of the present disclosure.

FIG. 2 is a diagram illustrating an example power converter system 200 (e.g., power converter systems 100, 300, 400, 500) that may have a plurality of power converters (e.g., devices 102, 104, 106, 140) connected in parallel. As shown in FIG. 2, the power converter system 200 may include power converters shown as device 240a, device 240b, a device 240c, Devices 240a, 240b, and 240c may include a buck converter, a boost converter, a charge pump circuit, or any other types of converter circuits. In various embodiments, power converter system 200 may have different operating ranges for different applications, such as an energy management system in large-scale data centers, a vehicle electrical system in automotive applications, etc. Although FIG. 2 shows three devices coupled in parallel, in other embodiments there can be as many devices coupled in parallel as required and suitable per practical design considerations.

Power converter system 200 that, similar to the embodiment shown in FIG. 1, may have a voltage source that provides a voltage VIN 241 to a devices 240a, 240b, and 240c. Each device may include a high side switch HS 242a, 242b, or 242c and a low side switch LS 244a, 244b, or 244c. In some embodiments, each device of devices 240a, 240b, or 240c may provide a voltage to an inductance (e.g., inductor) 246a, 246b, and 246c, respectively. In some embodiments, power converter system 200 may include a capacitance 243 (e.g., capacitance 143) across a load 248 (e.g., load 148). The inductance for each device and the capacitance together define an LC filter for each device that may output or regulate a voltage that may be provided to load 248.

In some embodiments, devices 240a, 240b, and 240c may include switches that need to be opened and closed at certain times. Thus, power converter system 200 may implicitly require one or more controllers 250 to provide control signals that open and close these switches. Controller 250 may include an input/output (I/O) node 254, an input voltage VIN 252, and a compensation/control node COMP 256. Controller 250 may provide a control signal to control switches (e.g., high side switch HS 242a, 242b, 242c or low side switch LS 244a, 244b, 244c) in devices 240a, 240b, and 240c. In other embodiments, for example at input/output node 254, the controller may receive other inputs such as input current/output current sensing, output voltage, digital/analog communications, etc.

Figure 3:
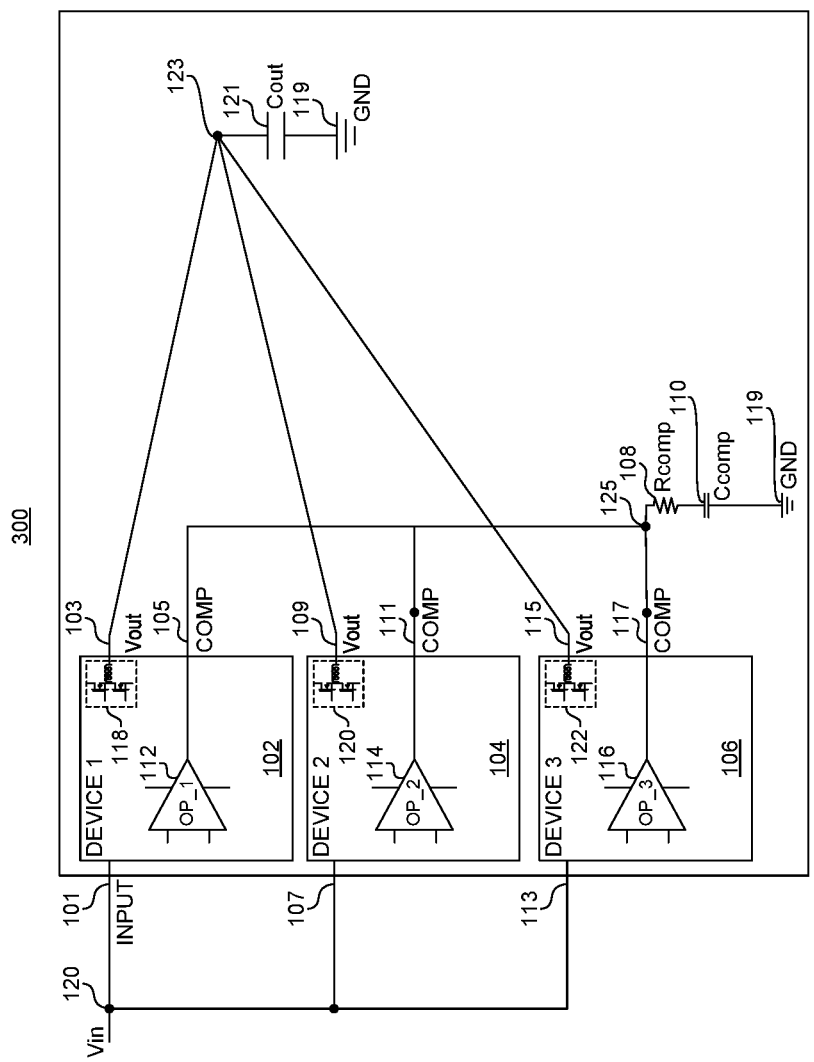
FIG. 3 is a diagram illustrating a power converter system that includes multiple power converters coupled in parallel, in accordance with embodiments of the present disclosure.

FIG. 3 is a diagram illustrating an example power converter system 300 (e.g., power converter systems 100, 200, 400, 500) that may have a plurality of power converters (e.g., devices 140, 240a, 240b, 240c) connected in parallel. As shown in FIG. 3, the power converter system 300 may include power converters shown as device 102, device 104, a device 106, each of which may be configured to convert an input voltage Vin from their respective input terminals 101, 107, 113 that are coupled together via a common input node 120, to an output voltage Vout at their respective second terminals 103, 109, and 115 that are coupled together via a common output node 123. Devices 102, 104, and 106 may include a power conversion circuit 118, 120, and 122 respectively, regulation circuits (e.g., shown by op-amps or transconductance amplifiers OP_1 112, OP_2 114, and OP_3 116) respectively, electrically coupled to control/compensation terminals/nodes (pins) comp 105, 111, and 117 (e.g., analog signal pins, op-amp pins, etc.). In some embodiments, op-amps, which output a voltage, may be used while in some embodiments transconductance amplifiers, which output a current, may be used. Also shown in FIG. 3 are an output capacitor Cout 121 coupled between common output node (regulation node) 123 and ground 119 (GND). Devices 102, 104, and 106 may include a buck converter, a boost converter, a charge pump circuit, or any other types of converter circuits. In various embodiments, power converter system 300 may have different operating ranges for different applications, such as an energy management system in large-scale data centers, a vehicle electrical system in automotive applications, etc. Although FIG. 3 shows three devices coupled in parallel, in other embodiments there can be as many devices coupled in parallel as required and suitable per practical design considerations.

Devices 102, 104, and 106 also include parallel control/compensation terminals/nodes (COMP) 105, 111, and 117, respectively which are coupled together at a common terminal/node 125 and to ground (GND) 119 (e.g., AC ground) via a circuit comprising a resistor Rcomp 108 and a capacitor Ccomp 110. In the existing systems, control/compensation terminals/nodes 105, 111, and 117 may be the output of op-amps 112, 114, and 116, respectively. In some embodiments, any of devices 102, 104, or 106 may include a compensation circuit, where the compensation circuit may include a resistor having a first terminal and a second terminal coupled in series with a capacitor having a first terminal and a second terminal. In some embodiments, the first terminal of the resistor may be coupled to the compensation/control terminal/node of the device, the second terminal of the resistor may be coupled to the first terminal of the capacitor, and the second terminal of the capacitor may be coupled to ground.

Common terminal/node 125 may be used for regulation purposes in various ways. For example, it may be appreciated that system 300 can be operated in a voltage mode control scheme or a current mode control scheme. Common terminal/node 125 can be used for controlling duty ratio when the system 100 is being operated in the voltage mode control scheme or for controlling peak current when the system is being operated in the current mode control scheme.

For example, in some embodiments, a voltage at the compensation/control terminal/node (e.g., compensation/control terminals/nodes 105, 111, or 117) may control the power conversion blocks at power conversion circuits 118, 120, or 122, which may adjust the output current at second terminals 103, 109, or 115. In some embodiments, at an op-amp of a device (e.g., op-amp OP_1 112, OP_2 114, OP_3 116), a difference between a reference voltage of its respective device (e.g., device 102, device 104, device 106) and an output voltage of system 300 may be calculated and adjusted by a feedback circuit implemented in system 100 and the adjusted output voltage of the op-amp may be used to control power conversion circuits 118, 120, or 122 of a device. Furthermore, resistor Rcomp 108 and Ccomp 110 may be specifically included to provide a compensation circuit for the output signal of the op amp OP_1 112, OP_2 114, OP_3 116). In some embodiments, during a normal operation mode of the system, an op-amp (e.g., OP_1 112, OP_2 114, and OP_3 116) of any of devices 102, 104, or 106 may provide its respective device with regulated output current at its respective compensation/control terminal/node.

Figure 4:
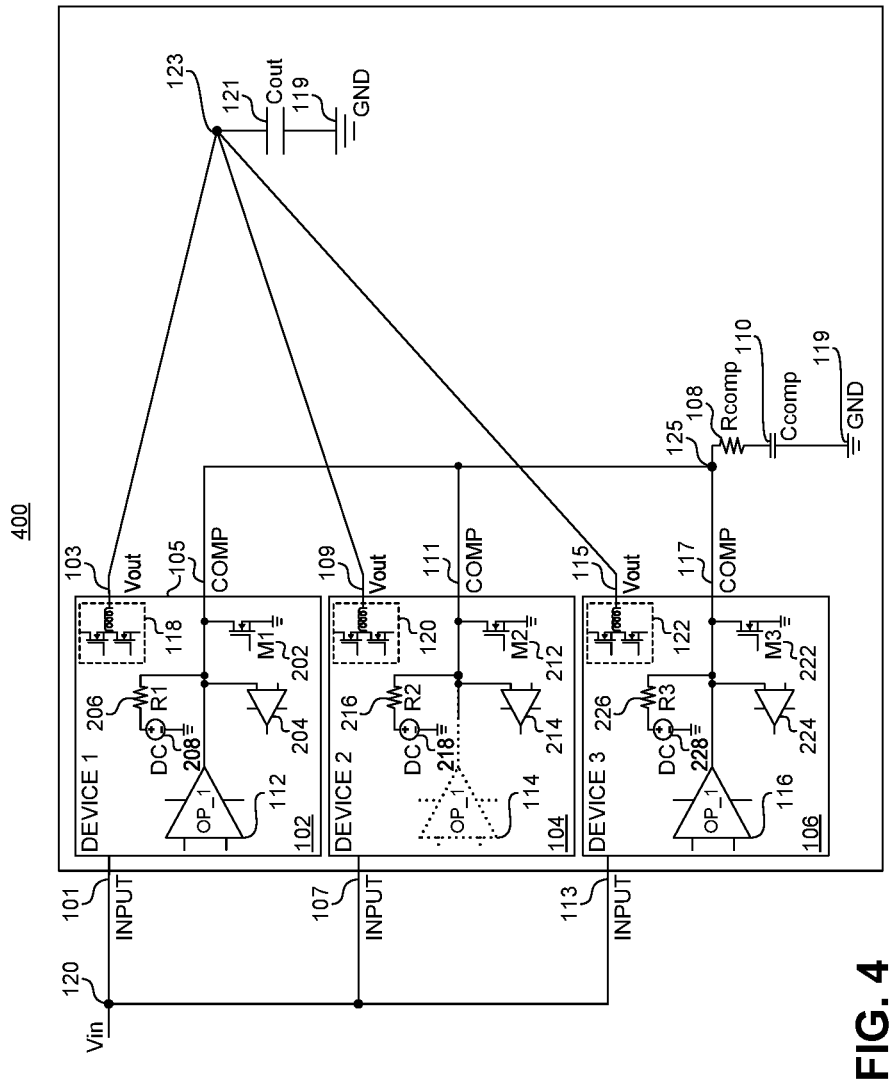
FIG. 4 is a diagram illustrating a power converter that includes multiple power converters coupled in parallel, in accordance with embodiments of the present disclosure.

FIG. 4 is a diagram illustrating a system 400 (e.g., power converter systems 100, 200, 300, 500) comprising a plurality of power converters (e.g., devices 140, 240a, 240b, 240c) coupled in parallel and including a multi-purpose (e.g., dual, third, fourth, etc.) regulation and fault handling terminal, in accordance with some embodiments of the present disclosure. System 400 is similar to system 300 of FIG. 3 in many aspects and similarly named and numbered elements are coupled in a similar manner in both systems. According to embodiments of this disclosure, system 400 provides a novel method to use common regulation terminal/node 125 to operate as a multi-purpose terminal, as a regulation terminal/node and also as a fault handing terminal. More specifically, in system 400, during the normal operation common terminal/node 125 can be used for providing the control for the regulation (e.g., as explained previously with respect to FIG. 3) and in the event of a fault detected by any of devices 102, 104, and 106, common terminal/node 125 can be used to take a fault protection measure such as shutting down system 200. For example, a compensation/control terminal/node (e.g., compensation/control terminals/nodes 105, 111, or 117) may be used for regulating its respective device and for fault handling communication between one or more devices.

As those skilled in the art may appreciate, a fault can occur in a power converter system for various reasons. One common reason can be a thermal failure (e.g., failure due to overheating) or an electrical failure (e.g., overcurrent due to overloading or overvoltage due to high voltage transients).

Although not shown in FIG. 4, system 400 may have a controller which may control the operation of various devices in various operating regions. For example, a controller (e.g., controller 250 of FIG. 2) may control any device (e.g., devices 102, 104, 106) to operate in a normal operating region (e.g., normal operation region 1106 of FIG. 11), a fault region (e.g., fault region 1102 of FIG. 11), or a wait region (e.g., wait region 1104 of FIG. 11).

System 400 may include additional circuitry in order to achieve the fault handing and communication feature, which will explained in more detail below. In some embodiments, each device of devices 102, 104, and 106 may include a voltage level detection circuit (not shown), a pull-down switch (e.g., a transistor), and a supplemental regulation circuit for fault handling and communication. For example, device 102 is shown to include a transistorized pull-down switch M1 202 and a DC voltage source 208 with a resistor R1 206 in series with it configured to work as a supplemental regulation circuit.

The supplemental regulation circuit (DC voltage source 208 with a resistor R1 206) may generate a voltage to regulate one or more devices when other forces (e.g., a pull-down switch or op-amp voltage outputs) are absent. For example, a supplemental regulation circuit may maintain a very low voltage upon receiving an indication that some other device has detected a fault. As such, the device that has detected an actual fault may generate a voltage that may be substantially zero (e.g., owing to pull-down switch M1 202), whereas the other devices (which are not at fault) can maintain a low voltage at their respective compensation/control terminals. In some embodiments, when a fault associated with a device is detected, an op-amp of any of devices 102, 104, or 106 may be shut down via a pull-down switch (e.g., MA 202, M2 212, M3 222) to make the regulated output current of one or more devices (without fault) substantially zero. It should be understood that a "low" voltage is not equivalent to a "weak voltage." For example, 0 V may be a "low" voltage that has a "strong" (i.e., not weak) signal.

Pull-down switch M1 202 may be coupled between regulation terminal/node 105 and ground 119. By virtue of its coupling, when activated pull-down switch M1 202 may couple regulation terminal/node 105 to ground 119. It may be appreciated that in other embodiments, pull-down switch M1 202 may be coupled differently instead of as a direct pull-down switch to ground. Any common methods in the art including various transistorized circuits may be used to implement a configuration equivalent to pull-down switch M1 202. Pull-down switch M1 202 may be internal or external to device 102. In other embodiments, one or more devices may include pull-down switches for other devices. In general, the pull-down switches can be configured in any arrangement as suitable per system design considerations.

Device 102 may also include a voltage detection circuit and other circuitry (not shown) to work in conjunction with pull-down switch M1 202 and the supplemental regulation circuit (e.g., DC voltage source 208 and resistor R1 206). Devices 104 and 106 may include similar circuitry. Particularly, device 104 may include a pull-down switch M2 212, comparator 214, and a supplemental regulation circuit (e.g., DC power source 218 and resistor R2 216). Similarly, device 106 is shown to include a pull-down switch M3 222, a comparator 224, and a supplemental regulation circuit (e.g., DC power source 228 and resistor R3 226).

System 400 may be configured to work in various modes of operation in response to the voltage (Vcomp) at common terminal/node 125. In a normal mode (e.g., without any fault), system 400 may operate to provide a regulated DC voltage at regulation node 123. At this time, the output may be provided by all devices (e.g., power converters) 102, 104, and 106 that are coupled in parallel and common terminal/node 125 may provide control for regulating regulation node 123 as explained with respect to FIG. 3.

If any device is at fault, then system 400 may operate in a fault communication and handling mode. In some embodiments, each device is configured in such a way that if there is a fault condition, then the op-amp (e.g., op-amp OP_1 112, op-amp OP_2 114, op-amp OP_3 116) may stop driving the compensation/control node such that the compensation/control node of that device may drop below a regulation threshold, which may be sensed by the voltage level detection circuit of that corresponding device. The voltage level detection circuit may then turn on the corresponding pull-down switch. When the pull-down switch is turned on, the corresponding comp terminal is coupled to ground, bringing the compensation/control terminal/node voltage Vcomp below a predefined threshold value Vfault. By virtue of the parallel configuration of the all the devices, when the compensation/control terminal/node voltage of one device falls below predefined threshold value Vfault, it may indicate to the other devices that one of the devices is at fault. The other devices may also then enter fault-protection mode. In other words, if one device is at fault then the fault may be communicated to the other devices.

When any other device receives an indication from the voltage level at the compensation/control node that there is a fault in the system, device(s) may stop driving the compensation/control node voltage and stop regulating the output current of the device(s). The supplemental regulation circuit (DC voltage source and the resistor R1 206, R2 216, or R3 226) may generate a voltage to regulate one or more devices when other forces (e.g., a pull-down switch or op-amp voltage outputs) are absent. For example, a supplemental regulation circuit may maintain a very low voltage. As such, the compensation/control terminal/node voltage of the device that has detected an actual fault may be substantially zero (owing to pull-down switch M1), whereas the other devices (which are not at fault) can maintain the low voltage at their respective compensation/control terminals/nodes. In some embodiments, a typical value for the weak voltage can be 0.5 V.

It may be appreciated that during normal operation, as explained with respect to FIG. 3, the compensation/control terminal/node voltage (Vcomp) of a device may be substantially equal to the voltage generated by the circuit (resistor Rcomp 108 and capacitor Ccomp 110) to provide regulation of output voltage Vout. However, when the device detects a fault, the compensation/control terminal/node voltage of that device may be substantially equal to zero due to its coupling to ground 119 caused by the turning on of pull-down switch M1.

Figure 5:
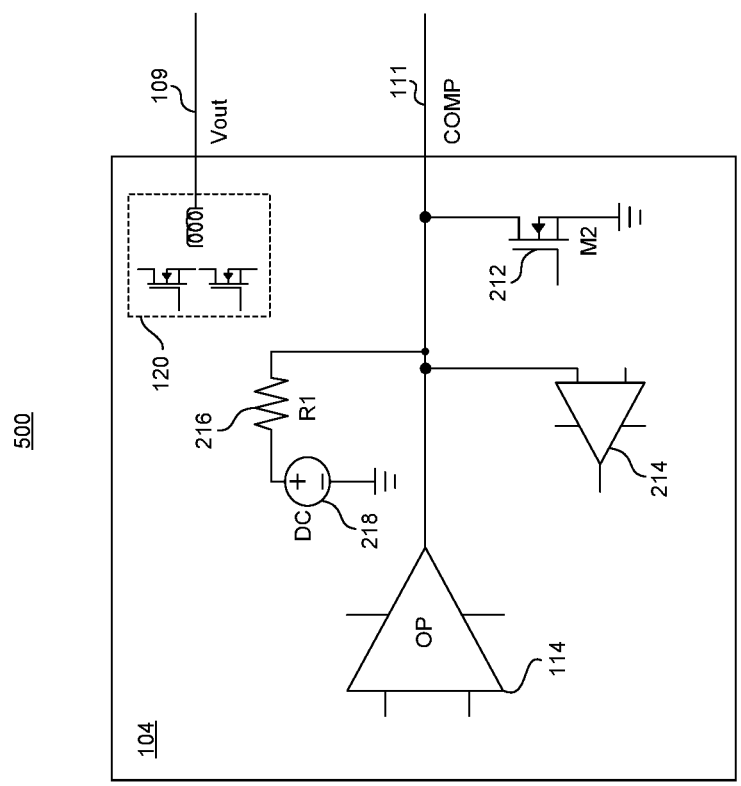
FIG. 5 is a diagram illustrating an exemplary fault handling circuit, in accordance with embodiments of the present disclosure.

FIG. 5 is a diagram illustrating details of exemplary fault handling circuit included in device 104 of system 400 of FIG. 4, in accordance with some embodiments of the present disclosure. As explained earlier, if device 104 is at fault, then the voltage detection circuit included in device 104 may activate or turn on pull-down switch M2 212 to make the compensation/control terminal/node voltage Vcomp lower than a predefined voltage Vfault. Comparator 214 may detect the compensation/control terminal/node voltage Vcomp is lower than predefined voltage Vfault (e.g., Vcomp<Vfault), which may signal to the other devices that one or more devices are at fault. In other words, the fault is broadcast to the other devices. The other devices may then proceed to taking fault protection measures, such as not providing voltage regulation. When device 104 is not in a voltage regulation mode, it may use the supplemental regulation circuit to maintain the value of compensation/control terminal/node voltage Vcomp to be higher than a fault threshold voltage Vfault and lower than a minimum normal operating voltage V_op(min). The force of the supplemental regulation circuit is weaker than any fault signaling a pull-down of the compensation/control terminal/node.

In other words, a fault condition generally has a higher priority over any other condition. When the fault disappears, the compensation/control terminal/node voltage Vcomp can gradually begin to rise, thereby indicating that the fault has disappeared. Once the fault disappears, the compensation/control terminal/node voltage Vcomp may gradually rise above predefined threshold value Vfault and eventually above minimum normal operating voltage V_op(min) after a predefined wait time. Once the compensation/control terminal/node voltage rises above minimum normal operating voltage V_op(min), the normal operation of the devices can resume. It may be appreciated that the predefined wait time is chosen per practical design considerations. In some embodiments a typical value for the predefined wait time can be 1 millisecond (ms). In some embodiments, the value for predefined threshold value Vfault may be 0.25 V. In some embodiments, the value for minimum normal operating voltage V_op(min) may be 1 V. For example, compensation/control terminal/node voltage Vcomp may be less than 0.25 V, where weak voltage Vweak may pull compensation/control terminal/node Vcomp to above 0.25 V (e.g., to 0.5 V) and normal operation may begin around 1 V.

Figure 6:
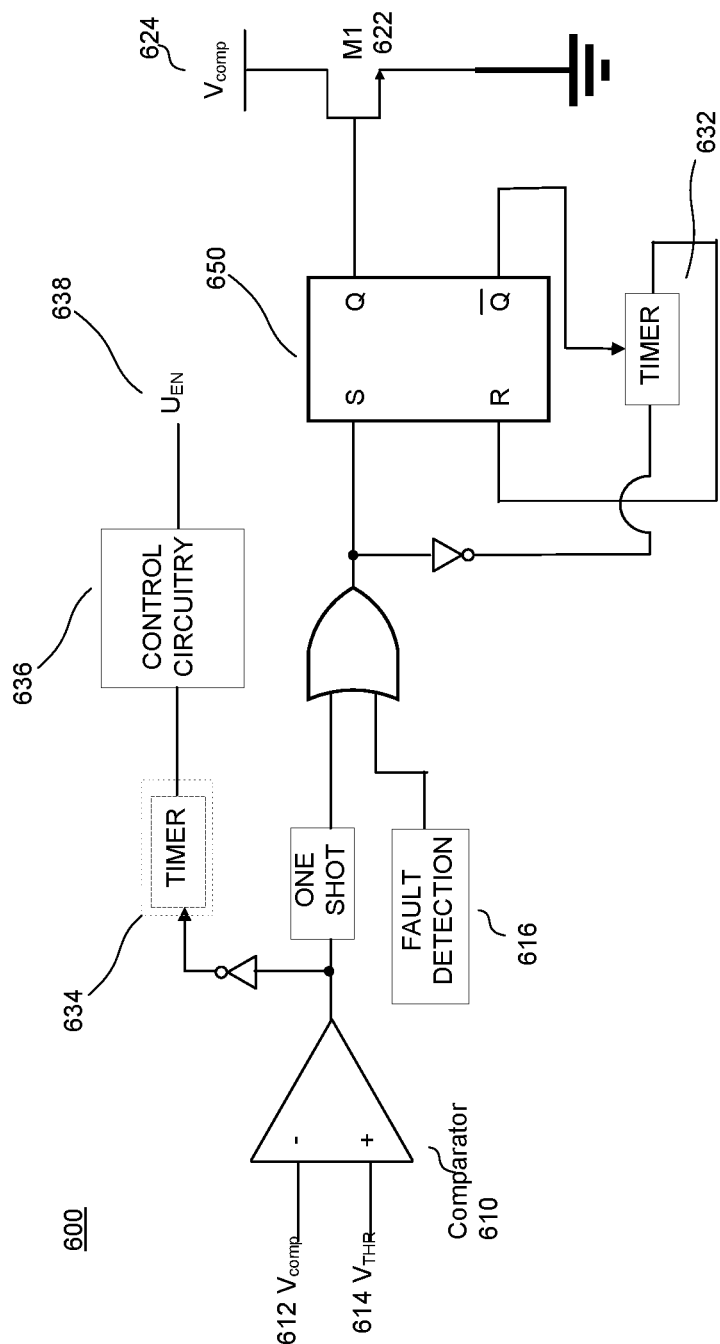
FIG. 6 is a diagram illustrating a logic circuit of an example power converter system that may include a power converter, in accordance with embodiments of the present disclosure.

FIG. 6 is a diagram illustrating a logic circuit 600 of an example power converter system (e.g., power converter systems 100, 200, 300, 400, 500) that may have a power converter (e.g., devices 102, 104, 106, 140, 240a, 240b, 240c). FIG. 6 shows an exemplary fault detection logic circuit 600, similar to embodiments disclosed in U.S. Pat. No. 8,619,445 B1, which is incorporated by reference in its entirety for all purposes.

For example, when a device corresponding to logic circuit has a fault, fault detection unit 616 of logic circuit 600 may trigger pull-down switch M1 622 (e.g., pull-down switches 202, 212, 222) such that the compensation/control node voltage $V_{comp}$ 624 of the device may decrease to below a threshold voltage $V_{THR}$ 614 (e.g., minimum normal operating V_op(min) 1110). Other devices may see, via a comparator 610, that some device has pulled down its compensation/control node voltage $V_{comp}$ 612 to below threshold voltage $V_{THR}$ 614. In some embodiments, other devices, which may not be at fault, may activate their respective pull-down switches to decrease their respective compensation/control node voltages to below a threshold voltage. When the pull-down switch of a device is activated, regulation of the corresponding integrated circuit may stop and the shut-down of circuits (e.g., compensation comparator) may commence.

In some embodiments, when the devices, including the faulted device, have activated their respective pull-down switch such that their respective compensation/control node voltage decreases below the threshold voltage, timer 632 may be activated. When the time of timer 632 has elapsed, the device may determine whether a fault in the device still exists. If the device does not have a fault, then the device may raise the compensation/control node voltage $V_{comp}$ 624 (e.g., raise the voltage to wait region). In some embodiments, timer 632 may reset latch 650.

In some embodiments, timer 634 may be activated when the compensation/control node voltage $V_{comp}$ 612 of the device decreases to below the threshold voltage $V_{THR}$ 614. When the time of timer 634 has elapsed, the system (e.g., power converter systems 100, 200, 300, 400, 500) may determine whether any faults exist in any of the devices and restart the circuitry (e.g., control circuitry 636) of the system to enable regulation of the system. In some embodiments, the enable signal $U_{EN}$ 638 may refer to a voltage, a current, etc. In one example, the enable signal $U_{EN}$ 638 may be a part of the circuitry that enables/disables the supply to transconductance amplifier 114 in FIG. 5

Figure 7:
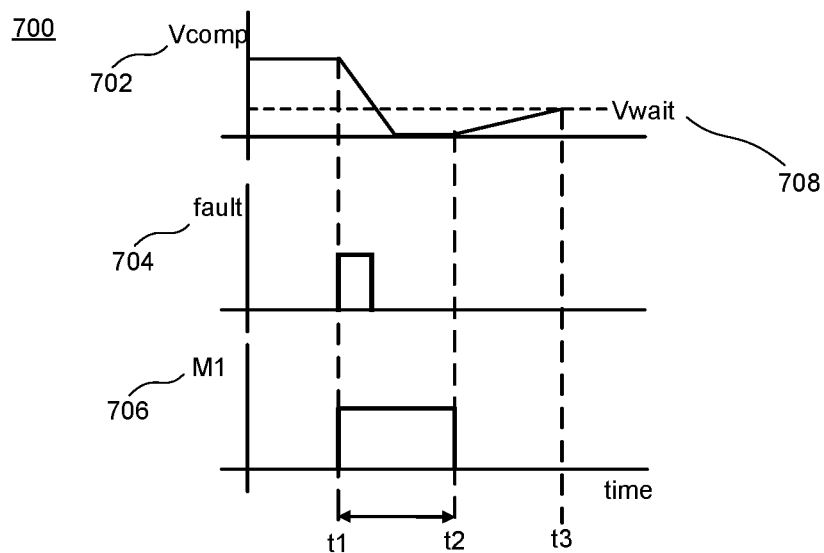
FIG. 7 is a diagram illustrating an exemplary voltage and signal graph of a power converter in a power converter system, in accordance with embodiments of the present disclosure.

FIG. 7 is a diagram illustrating exemplary voltage and signal graph 700 of a power converter (e.g., devices 102, 104, 106, 140, 240a, 240b, 240c) in a power converter system (e.g., power converter systems 100, 200, 300, 400, 500). As shown in FIG. 7 at time t1, compensation/control node voltage Vcomp 702 of a device may decrease, corresponding to fault signal 704 associated with a fault in the device and the activation of pull-down switch M1 signal 706 (e.g., associated with pull-down switches 202, 212, 222, 622) of the device. As shown in FIG. 7, compensation/control node voltage Vcomp 702 of the device may decrease to below a threshold voltage Vwait 708 (e.g., wait region 1104) and the fault in the device maybe eliminated. While the fault in the device may be eliminated before a time t2, pull-down switch M1 may continue to be activated until time t2 for robustness in device and system. When pull-down switch M1 is no longer activated at time t2, compensation/control node voltage Vcomp 702 may increase to reach threshold voltage Vwait 708 at a time t3.

Figure 8:
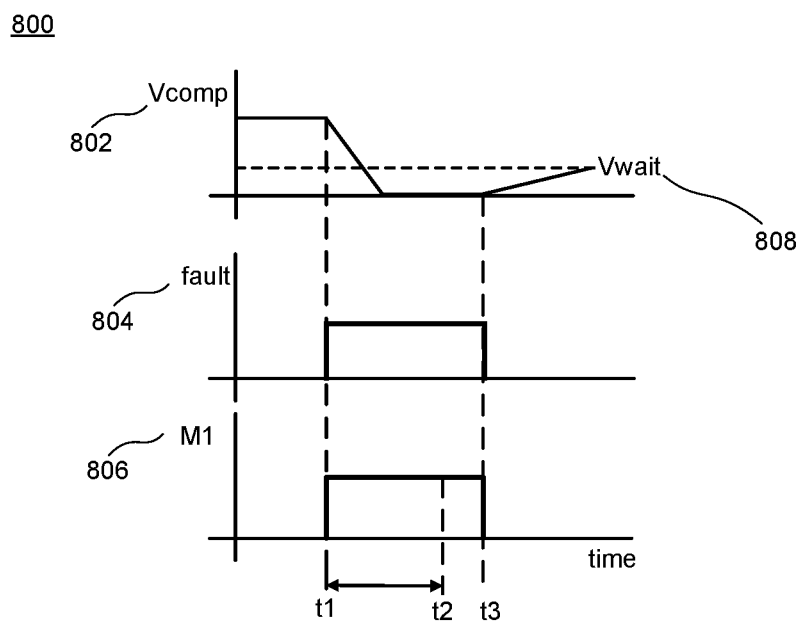
FIG. 8 is a diagram illustrating an exemplary voltage and signal graph of a power converter in a power converter system, in accordance with embodiments of the present disclosure.

Similar to FIG. 7, FIG. 8 is a diagram illustrating exemplary voltage and signal graph 800 of a power converter (e.g., devices 102, 104, 106, 140, 240a, 240b, 240c) in a power converter system (e.g., power converter systems 100, 200, 300, 400, 500). As shown in FIG. 8 at time t1, compensation/control node voltage Vcomp 802 of the device may decrease, corresponding to fault signal 804 associated with a fault in the device and the activation of pull-down switch M1 signal 806 of the device. As shown in FIG. 8, compensation/control node voltage Vcomp 802 of the device may decrease to below a threshold voltage Vwait 808 (e.g., wait region 1104). In some embodiments, the fault in the device may persist past a time t2 until a time t3. For example, faults related to overtemperature and overcurrent may persist for a longer period of time than other types of faults. As a result, pull-down switch M1 may continue to be activated until time t3 when the fault in the device ends. When pull-down switch M1 is no longer activated at time t3, compensation/control node voltage Vcomp 802 may increase to reach threshold voltage Vwait 808.

Figure 9:
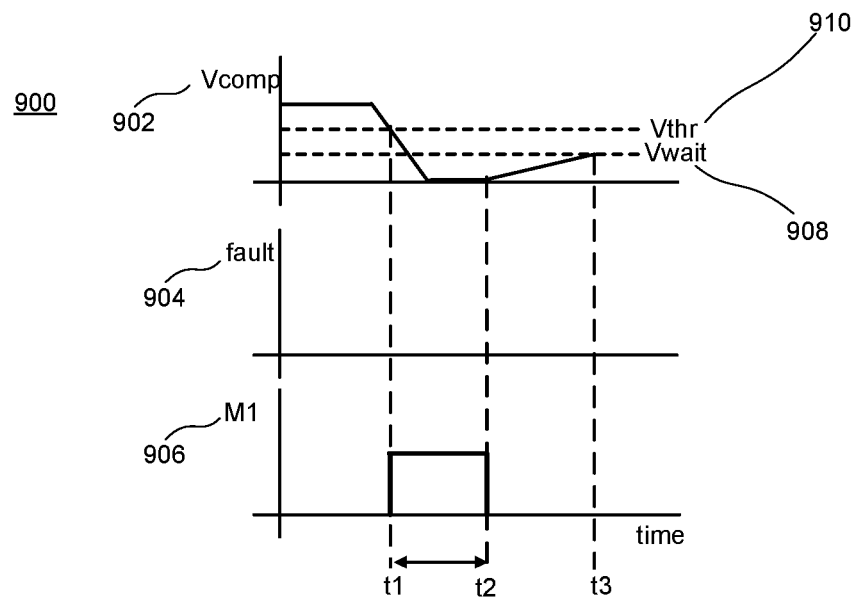
FIG. 9 is a diagram illustrating an exemplary voltage and signal graph of a power converter in a power converter system, in accordance with embodiments of the present disclosure.

FIG. 9 is a diagram illustrating exemplary voltage and signal graph 900 of a power converter (e.g., devices 102, 104, 106, 140, 240a, 240b, 240c) in a power converter system (e.g., power converter systems 100, 200, 300, 400, 500). As shown in FIG. 9 at time t1, compensation/control node voltage Vcomp 902 of a non-fault device may decrease to a threshold voltage Vthr 910 without a fault signal 904 of the device and with the activation of pull-down switch M1 signal 906 of the non-fault device. The absence of a fault signal, the decrease in compensation/control node voltage Vcomp 902, and the activation of pull-down switch M1 signal 906 associated with the non-fault device may indicate that a fault was detected in some other device in the system. As shown in FIG. 9, compensation/control node voltage Vcomp 902 of the non-fault device may decrease to below a threshold voltage Vwait 908 and the fault in another device in the system may be eliminated. While the fault in another device may be eliminated before a time t2, pull-down switch M1 of the non-fault device may continue to be activated until time t2 for robustness in the non-fault device and the system. When pull-down switch M1 of the non-fault device is no longer activated at time t2, compensation/control node voltage Vcomp 902 of the non-fault device may increase to reach threshold voltage Vwait 908 at a time t3.

Figure 10:
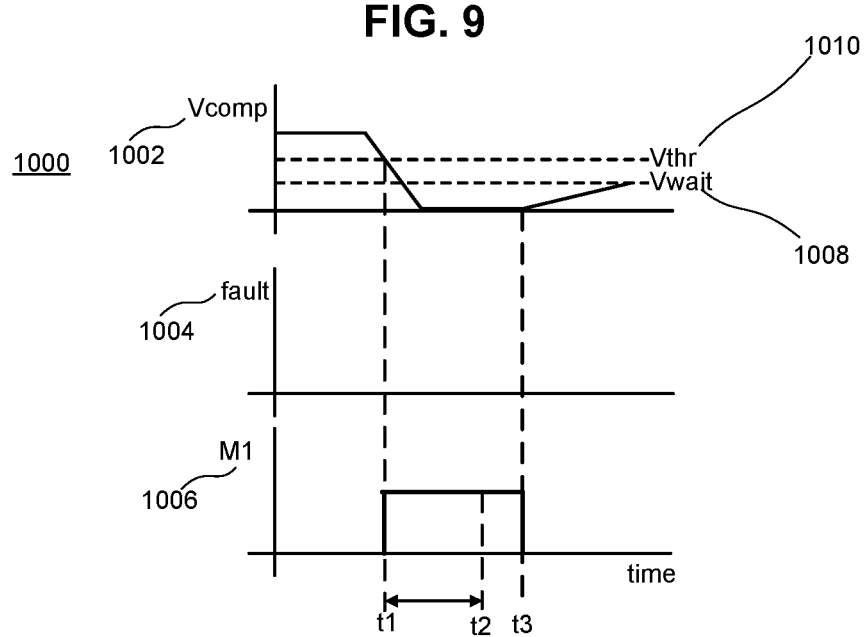
FIG. 10 is a diagram illustrating an exemplary voltage and signal graph of a power converter in a power converter system, in accordance with embodiments of the present disclosure.

Similar to FIG. 9, FIG. 10 is a diagram illustrating exemplary voltage and signal graph 1000 of a power converter (e.g., devices 102, 104, 106, 140, 240*a*, 240*b*, 240*c*) in a power converter system (e.g., power converter systems 100, 200, 300, 400, 500). As shown in FIG. 10 at time t1, compensation/control node voltage Vcomp 1002 of a non-fault device may decrease to a threshold voltage Vthr 1010 without a fault signal 1004 of the device and with the activation of pull-down switch M1 signal 1006 of the non-fault device. The absence of a fault signal, the decrease in compensation/control node voltage Vcomp 1002, and the activation of pull-down switch M1 associated with the non-fault device may indicate that a fault was detected in some other device in the system. As shown in FIG. 10, compensation/control node voltage Vcomp 1002 of the non-fault device may decrease to below a threshold voltage Vwait 1008. In some embodiments, the fault in another device may persist past a time t2 until a time t3. For example, faults related to overtemperature and overcurrent may persist for a longer period of time than other types of faults. As a result, pull-down switch M1 of the non-fault device may continue to be activated until time t3 when the fault in another device ends. When pull-down switch M1 of the non-fault device is no longer activated at time t3, compensation/control node voltage Vcomp 1002 of the non-fault device may increase to reach threshold voltage Vwait 1008.

Figures 11, 12:
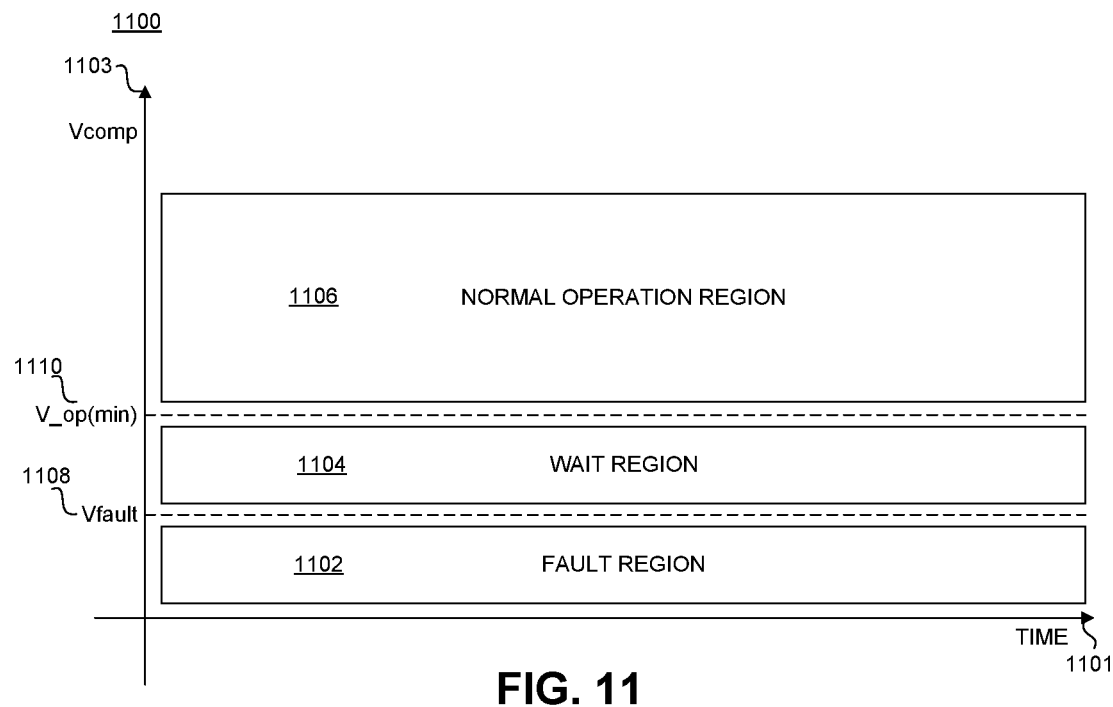
FIG. 11 is a diagram illustrating voltage levels for fault handing of power converters, in accordance with embodiments of the present disclosure.
FIG. 12 is a table corresponding to various operating regions for power converters in a power converter system, in accordance with embodiments of the present disclosure.

FIG. 11 is a diagram illustrating comp terminal voltage levels related to various operating regions for the devices included in system 400 of FIG. 4 (e.g., systems 100, 300, 400, 500), in accordance with some embodiments of the present disclosure. As shown, the devices in system 400 can operate in three different regions: a fault region 1102, a wait region 1104, and a normal operation region 1106. Fault region 1102 may have an upper boundary predefined threshold value V_fault 1108. Wait region 1104 may have a lower boundary predefined threshold value V_fault 1108 and an upper boundary minimum normal operating voltage V_op (min) 1110. Normal operation region 1106 may have a lower boundary minimum normal operating V_op(min) 1110.

Referring back to FIG. 4 and FIG. 5, comparator 214 (and corresponding comparators in other devices) may be used to detect various operating regions of device 104 based on the voltage of second terminal 109. Comparator 213 may further provide a digital signal to the controller (not shown) to perform operation related tasks for device 104.

The boundary values may represent compensation/control terminal/node voltage values which may signal a fault condition, a wait condition, or a normal operation condition. It may be appreciated from FIG. 11 that for any device, when the compensation/control terminal/node voltage Vcomp falls below predefined threshold value V_fault 1108, the device enters the fault region and a fault may be signaled to other devices. Once the fault has subsided, the device can enter wait region 1104. At this time all the other devices can also stay in the wait region for a predefined time, after which the device can enter back to normal operation region 1106. In some embodiments, the faulting device(s) may maintain the compensation/control terminal/node voltage Vcomp in fault region 1102 for a pre-determined duration of time. The faulting device(s) may release the fault, allowing the compensation/control terminal/node voltage Vcomp to rise to wait region 1104, signaling that the compensation/control terminal/node voltage Vcomp may rise to normal operation region 1106 without any additional waiting period.

It may be appreciated that wait region 1104 is used for hand-shaking among various devices. During the predefined wait time, the controller (e.g., control circuit, control circuitry, etc.) (not shown) can confirm that the fault has disappeared from all the devices. Additionally, it can be used for synchronizing the start-up operation of all the devices. In other embodiments, the devices can come out of wait region 1104 sequentially based on a predefined priority scheme. In one such priority scheme, the master device can come out of the wait region first and the other devices can follow the master device. In some embodiments, one or more devices (e.g., devices 102 or 106) may control the compensation/control terminal/node voltage Vcomp of one or more other devices (e.g., device 104) such that the compensation/control terminal/node voltage Vcomp of the one or more other devices rise into normal operation region 1106.

Various types of detecting circuits or sensors may be applied for fault detection, consistent with this disclosure. For example, a temperature sensor may be used to monitor the temperature of the power converter. In some embodiments, the detecting circuits may further be configured to detect the fault level and whether the fault is cleared. The detecting circuit may output a signal corresponding to the fault state to trigger operations. For example, the detecting circuit may provide a signal that limits the fault condition while maintaining operation and regulation of the second terminal (e.g., second terminals 103, 109, or 115). In some embodiments, the detecting circuits may output corresponding signal(s) to automatically disable the regulation of the second terminal and latch-off, to perform auto restart/reset, etc. For example, these operations may be set in response to the fault conditions by one or more digital bits in the fault signals.

FIG. 12 is a table 1200 corresponding to the various operating regions for devices depicted in FIG. 4. As shown in FIG. 12, pull-down switch M1 (e.g., pull-down switch M1 202, pull-down switch M2 212, or pull-down switch M3 222), weak pull-up (e.g., resistor R1 206, resistor R2 216, or resistor R3 226), and op-amps or transconductance amplifier OP (e.g., op-amps or transconductance amplifiers OP_1_112, OP_2_114, or OP_3_116) may be activated to "ON" or deactivated to "OFF" for different operating regions for the devices. For example, in normal operation region 1106, pull-down switch M1 may be deactivated, weak pull-up may be deactivated, and op-amps or transconductance amplifier OP may be activated. In wait region 1104, pull-down switch M1 may be deactivated, weak pull-up may be activated, and op-amps or transconductance amplifier OP may be deactivated. In fault region 1102, pull-down switch M1 may be activated, weak pull-up may be activated, and op-amps or transconductance amplifier OP may be deactivated. In fault region 1102, while pull-down switch M1 and weak pull-up are both activated, a device may generate a voltage that is substantially zero due to pull-down switch M1 being activated since the signal of pull-down switch M1 is greater than the signal of weak pull-up.

Figure 13:
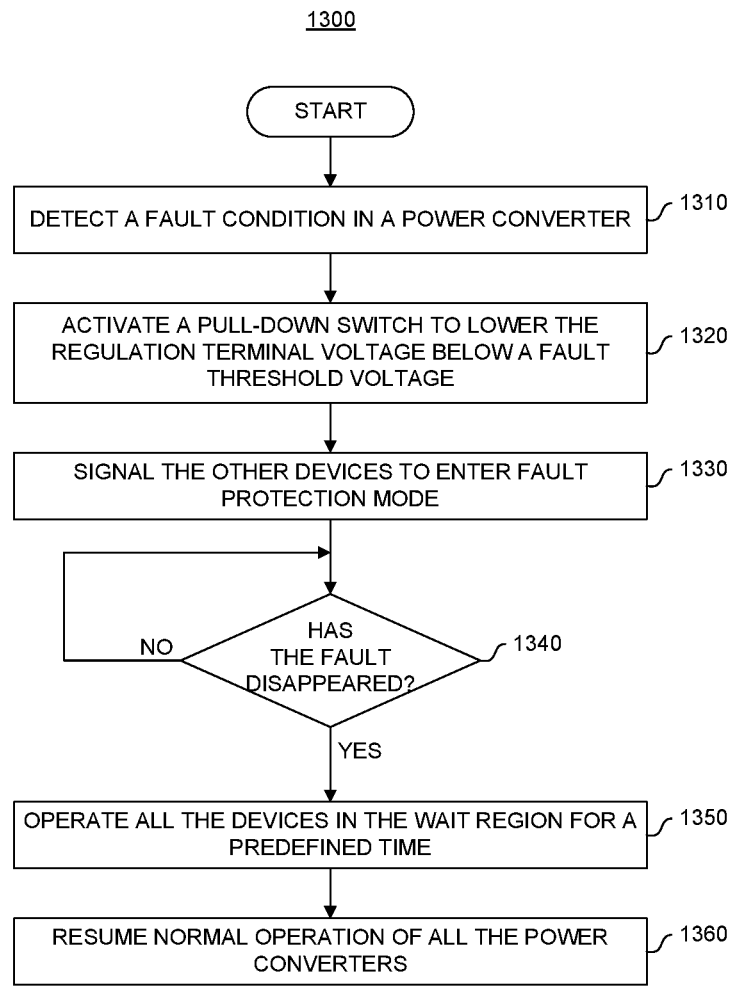
FIG. 13 is a flowchart illustrating an exemplary method of fault control, in accordance with embodiments of the present disclosure.

FIG. 13 is a flowchart of a method 1300 for fault handling and communication in a power converter system, in accordance with some embodiments of the present disclosure. It is understood that additional operations may be performed before, during, and/or after method 1300 depicted in FIG. 13, and that some other processes may only be briefly described herein. Method 500 can be performed by circuits and components in the power converter, e.g., devices 102, 104, or 106 illustrated in any of FIGS. 3-5, but method 1300 is not limited to being performed using those specific systems.

In step 1310, method 1300 may detect a fault condition in a power converter. For example, system 400 may detect a fault condition due to a thermal or an electrical failure (e.g., or other failures, etc.). In some embodiments, a regulation circuit coupled to a regulation terminal/node of one or more of devices 102, 104, or 106 may detect a fault condition by detecting a voltage of the compensation/control terminal/node below a minimum normal operating voltage (e.g., below minimum operation voltage threshold V_op(min) of normal operation region 1106 of FIG. 11). In some embodiments, a detection circuit coupled to an output node of one or more of devices 102, 104, or 106 may detect the fault associated with a device based on the voltage of the compensation/control terminal/node of the device.

In step 1320, a system (e.g., a detection circuit coupled to the output node of a device) may activate an internal switch included in the device which has detected a fault. For example, in system 400, if a particular device detects a fault, then a pull-down switch in that device may be activated to lower the regulation terminal/node voltage below a fault threshold voltage (e.g., Vcomp<Vfault) and the device may enter a fault region (e.g., fault region 1102 of FIG. 11). In this example, if device 104 in system 200 detects a fault, then the internal pull-down switch M2 212 may be activated to lower the voltage at compensation/control terminal/node 111 to below predefined threshold value Vfault. In some embodiments, the value for predefined threshold value Vfault may be 0.25 V. In some embodiments, reducing the compensation/control terminal/node voltage may include using a stand-by DC voltage supply of a device (e.g., devices 102, 104, or 106) to supply the compensation/control terminal/node of a device.

In step 1330, a system (e.g., a detection circuit coupled to the output node of a device) may signal the other devices to enter a fault protection mode. For example, after device 104 of system 400 has detected a fault and entered a fault region, it may signal devices 102 and 106 to enter a fault protection mode. In some embodiments, device 104 may signal devices 102 and 106 that the compensation/control terminal/node voltage of device 102 is below minimum normal operating voltage V_op(min). In the fault protection mode, all the other devices (e.g., by a respective regulation circuit) may output a very low voltage (e.g., weak voltage Vweak) at their respective compensation/control terminals/nodes. In some embodiments, upon determining that the compensation/control terminal/node voltage of device 104 is below minimum normal operating voltage V_op(min), devices 102 or 106 may reduce (e.g., by a regulation circuit) their respective compensation/control terminal/node voltages to below predefined threshold value Vfault.

In step 1340, a system may check if the fault has disappeared by monitoring the voltage of the compensation/control terminal/node. For example, the system (e.g., by a detection circuit of device 104) may check if the compensation/control terminal/node voltage Vcomp has increased to above predefined threshold value Vfault until the fault disappears. For example, in system 200, device 104 may check if the fault has disappeared by monitoring the voltage at compensation/control terminal/node 111 until compensation/control terminal/node voltage Vcomp is greater than predefined threshold value Vfault. In some embodiments, if the fault has not disappeared, device 104 may check if the fault has disappeared again until it detects that the fault has disappeared. In some embodiments, upon detecting that the compensation/control terminal/node voltage of device 104 is greater than predefined threshold value Vfault, device 104 may increase its compensation/control terminal/node voltage Vcomp to at least minimum normal operating voltage V_op(min) and signal to devices 102 and 106 that the compensation/control terminal/node voltage Vcomp of device 104 is greater than predefined threshold value Vfault. In some embodiments, increasing the compensation/control terminal/node voltage may include deactivating the pull-up switch.

In step 1350, upon detecting that the fault has disappeared, all the devices may operate in the wait region for a predefined amount of time. For example, in system 400, when the fault of device 104 disappears, device 104 and devices 102 and 106 can operate in the wait region. At this time, the voltages at the compensation/control terminals/nodes can be higher than predefined threshold value Vfault 1108 and lower than minimum normal operating voltage V_op(min) 1110 as shown in FIG. 11. In some embodiments, the value for predefined threshold value Vfault may be 0.25 V. In some embodiments, the value for minimum normal operating voltage V_op(min) may be 1 V. For example, upon determining that the compensation/control terminal/node voltage of device 102 is greater than Vfault, devices 104 or 106 may (e.g., by their respective circuitry) increase their respective compensation/control terminal/node voltages to at least V_op(min).

In step 1360, all the devices, and thereby the whole system, can resume normal operation. At this time, the compensation/control terminal/node voltage may be higher than the minimum normal operating voltage. For example, devices 102, 104, and 106 of system 400 can resume normal operation. In this example, the voltages at respective compensation/control terminals/nodes 105, 111, and 117 are higher than the V_op(min). For example, compensation/control terminal/node voltage Vcomp may be less than 0.25 V, where weak voltage Vweak may pull compensation/control terminal/node Vcomp to above 0.25 V (e.g., to 0.5 V) and normal operation may begin around 1 V.

Figure 14:
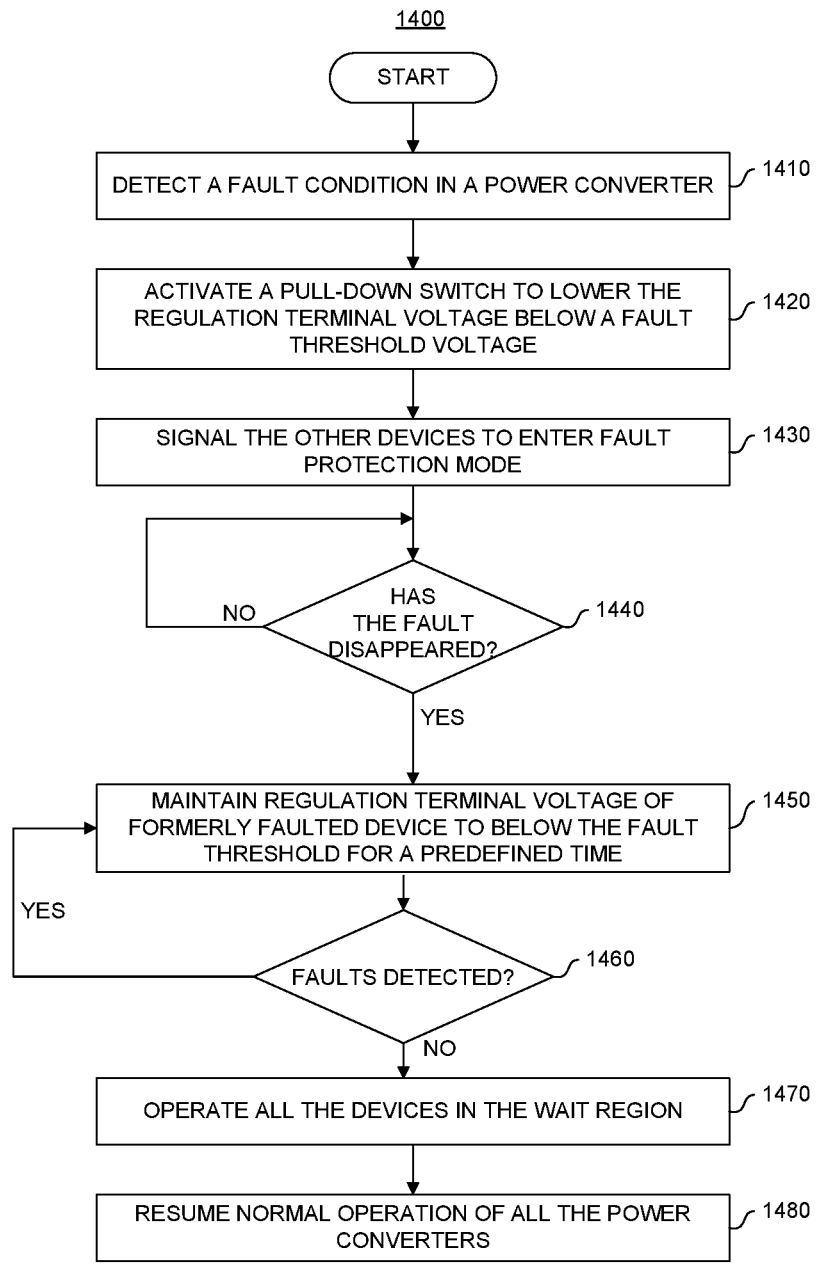
FIG. 14 is a flowchart illustrating an exemplary method of fault control, in accordance with embodiments of the present disclosure.

FIG. 14 is a flowchart of a method 600 for fault handling and communication in a power converter system, in accordance with some embodiments of the present disclosure. It is understood that additional operations may be performed before, during, and/or after method 1400 depicted in FIG. 14, and that some other processes may only be briefly described herein. Method 1400 can be performed by circuits and components in the power converter, e.g., the devices 102, 104, or 106 illustrated in any of FIGS. 3-5, but method 1400 is not limited to being performed using those specific systems.

In step 1410, method 1400 may detect a fault condition in a power converter. For example, system 400 may detect a fault condition due to a thermal or an electrical failure (e.g., or other failures, etc.). In some embodiments, a regulation circuit coupled to a compensation/control terminal/node of one or more of devices 102, 104, or 106 may detect a fault condition by detecting a voltage of the compensation/control terminal/node below a minimum normal operating voltage (e.g., below minimum operating voltage threshold V_op (min) of normal operation region 1106 of FIG. 11). In some embodiments, a detection circuit coupled to an output node of one or more of devices 102, 104, or 106 may detect the fault associated with a device based on the voltage of the compensation/control terminal/node of the device.

In step 1420, a system (e.g., a detection circuit coupled to the output node of a device) may activate an internal switch included in the device which has detected a fault. For example, in system 400, if a particular device detects a fault, then a pull-down switch in that device may be activated to lower the compensation/control terminal/node voltage below a fault threshold voltage (e.g., Vcomp<Vfault) and the device may enter a fault region (e.g., fault region 1102 of FIG. 11). In this example, if device 104 in system 400 detects a fault, then the internal pull-down switch M2 212 may be activated to lower the voltage at compensation/control terminal/node 111 to below predefined threshold value Vfault. In some embodiments, the value for predefined threshold value Vfault may be 0.25 V. In some embodiments, reducing the compensation/control terminal/node voltage may include using a stand-by DC voltage supply of a device (e.g., devices 102, 104, or 106) to supply the compensation/control terminal/node of a device.

In step 1430, a system (e.g., a detection circuit coupled to the output node of a device) may signal the other devices to enter a fault protection mode. For example, after device 104 of system 400 has detected a fault and entered a fault region, it may signal devices 102 and 106 to enter a fault protection mode. In some embodiments, device 104 may signal devices 102 and 106 that the compensation/control terminal/node voltage of device 102 is below minimum normal operating voltage V_op(min). In the fault protection mode, all the other devices (e.g., by a respective regulation circuit) may output a very low voltage (e.g., weak voltage Vweak) at their respective compensation/control terminals/nodes. In some embodiments, upon determining that the compensation/control terminal/node voltage of device 104 is below minimum normal operating voltage V_op(min), devices 102 or 106 may reduce (e.g., by a regulation circuit) their respective compensation/control terminal/node voltages to below predefined threshold value Vfault.

In step 1440, a system may check if the fault has disappeared by monitoring the voltage of the compensation/control terminal/node. For example, the system (e.g., by a detection circuit of device 104) may check if the compensation/control terminal/node voltage Vcomp has increased to above the predefined threshold value Vfault until the fault disappears. For example, in system 400, device 104 may check if the fault has disappeared by monitoring the voltage at regulation terminal/node 111 until compensation/control terminal/node voltage Vcomp is greater than predefined threshold value Vfault. In some embodiments, if the fault has not disappeared, device 104 may check if the fault has disappeared again until it detects that the fault has disappeared.

In step 1450, if the fault has disappeared, the device that had a fault may maintain the voltage of its respective regulation terminal/node below a fault threshold voltage (e.g., Vcomp<Vfault) for a pre-defined period of time.

In step 1460, if no faults are detected (e.g., the internal pull-down switch is not activating to lower the voltage at the compensation/control terminals/nodes of other devices to below Vfault) during the pre-defined period of time, then in step 1470 the system may increase the voltage of the compensation/control terminal/node to at least the fault threshold voltage (e.g., in wait region 1104 of FIG. 11, V_op(min)≥Vcomp≥Vfault). In some embodiments, the value for predefined threshold value Vfault may be 0.25 V. In some embodiments, the value for minimum normal operating voltage V_op(min) may be 1 V. If one or more faults are detected in any of the devices during the predetermined period of time, then the system may maintain the voltage of its respective compensation/control terminal/node below the fault threshold voltage for additional periods of time until no faults are detected.

In step 1480, if no faults are detected (e.g., the internal pull-down switch is not activating to lower the voltage at the compensation/control terminals/nodes of other devices to below Vfault) while the voltage of the compensation/control terminal/node is in the wait region, then the system may increase the voltage of the compensation/control terminal/node of the devices to a minimum operating voltage (e.g., normal operation region 1106 of FIG. 11). In this example, the voltages at respective compensation/control terminals/nodes 105, 111, and 117 are higher than the V_op(min).

Various embodiments described above can be implemented in various over-stress scenarios for different power system levels and for applications supporting different standards or regulations. For example, power converters and methods for protecting power converters can be applied in high-reliability applications, automotive applications, and/or military applications, and can be applied to address the hot-swap and hot-plug overstress issues in datacenter applications.

Disclosed methods and processes (e.g., methods 1300 or 1400) may be implemented in hardware, software instructions, or a combination of the two. In some embodiments, methods 1300 or 1400 may be implemented in fixed circuitry, such as with the circuitry discussed throughout this disclosure or other application-specific circuitry. In some embodiments, methods and process may be implemented through programmable instructions, such as volatile memory, nonvolatile memory, hard-coded media, and other mechanisms to store software instructions. In some embodiments, methods and process may be implemented in a combination of hardware and software. For example, fixed circuitry may be operated by a programmable controller. The controller may load instructions from on-board or off-board storage in order to control circuitry to collectively perform disclosed methods and process.

In the foregoing specification, embodiments have been described with reference to numerous specific details that can vary from implementation to implementation. Certain adaptations and modifications of the described embodiments can be made. It is also intended that the sequence of steps shown in figures is only for illustrative purposes and is not intended to be limited to any particular sequence of steps. As such, those skilled in the art can appreciate that these steps can be performed in a different order while implementing the same method.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiment of the specification. Certain features described in the context of various embodiments are not to be considered essential features of those embodiments unless the embodiment is inoperative without those elements.

The embodiments may further be described using the following clauses:

1. A fault handling apparatus comprising:
a first power converter and a second power converter;
the first and second power converters each including an output terminal and a control terminal, the first and second power converters to regulate voltage or current at their respective output terminals based on a voltage at their respective control terminals, the output terminals coupled to each other, and the control terminals coupled to each other;
wherein the first power converter comprises:
a first detection circuit to detect a fault condition associated with the first power converter, and
a first signaling circuit to generate a first fault signal at the control terminal of the first power converter after the first detection circuit detects the fault condition associated with the first power converter;
wherein the second power converter comprises:
a first fault protection circuit to change an operating mode of the second power converter after the first signaling circuit generates the first fault signal at the control terminal of the first power converter.

2. The apparatus of clause 1, wherein the first power converter and the second power converter are DC-DC converters.

3. The apparatus of clause 2, wherein the first power converter and the second power converter are step-down converters.

4. The apparatus of clause 3, wherein the first power converter and the second power converter are buck converters.

5. The apparatus of clause 1, wherein an input of the first power converter and an input of the second power converter are coupled to each other.

6. The apparatus of clause 1, wherein the fault condition is an over-temperature condition.

7. The apparatus of clause 1, wherein the fault condition is an over-current condition.

8. The apparatus of clause 1, wherein the first detection circuit is to sense that a voltage at the control terminal of the first power converter is below a regulation threshold.

9. The apparatus of clause 8, wherein the first signaling circuit is to reduce a voltage at the control terminal of the first power converter below a fault threshold after the first detection circuit senses that the voltage at the control terminal of the first power converter is below the regulation threshold.

10. The apparatus of clause 9, wherein the first fault protection circuit is to change the operating mode of the second power converter after the first signaling circuit reduces the voltage at the control terminal of the first power converter below the fault threshold.

11. The apparatus of clause 10, wherein the first fault protection circuit is further to change the operating mode of the second power converter after the voltage at the control terminal of the second power converter reduces below the fault threshold.

12. The apparatus of clause 11, wherein the first fault protection circuit is to change the operating mode of the second power converter from a normal mode to a fault protection mode after the first signaling circuit reduces the voltage at the control terminal of the first power converter below the fault threshold.

13. The apparatus of clause 12, wherein the first fault protection circuit is to reduce a voltage at the control terminal of the second power converter below the fault threshold after the first signaling circuit reduces the voltage at the control terminal of the first power converter below the fault threshold.

14. The apparatus of clause 12, wherein the second power converter further comprises a supplemental regulation circuit to maintain a voltage at the control terminal of the second power converter above the fault threshold but below a minimum normal operating voltage after the first signaling circuit reduces the voltage at the control terminal of the first power converter below the fault threshold.

15. The apparatus of clause 13, wherein the second power converter further comprises a timer circuit, the timer circuit to be activated after the first fault protection circuit reduces the voltage at the control terminal of the second power converter below the fault threshold, the timer circuit further to output a time elapsed signal after a time period.

16. The apparatus of clause 15, the first fault protection circuit is further to change the operating mode of the second power converter after the timer circuit outputs the time elapsed signal.

17. The apparatus of clause 16, wherein the first fault protection circuit is to change the operating mode of the second power converter from a fault protection mode to a wait mode after the timer circuit outputs the time elapsed signal.

18. The apparatus of clause 17, wherein the first fault protection circuit is to increase the voltage at the control terminal of the second power converter above the fault threshold to a wait threshold after the timer circuit outputs the time elapsed signal.

19. The apparatus of clause 9, wherein the first power converter further comprises a timer circuit, the timer circuit to activate after the first signaling circuit reduces the voltage at the control terminal of the first power converter below the fault threshold, the timer circuit further to output a time elapsed signal after a time period.

20. The apparatus of clause 19, wherein:
the first detection circuit is further to detect disappearance of the fault condition associated with the first power converter after the timer circuit outputs the time elapsed signal;
the first signaling circuit is further to generate a first wait signal at the control terminal of the first power converter after the first detection circuit detects the disappearance of the fault condition associated with the first power converter; and
the first fault protection circuit is further to change the operating mode of the second power converter after the first signaling circuit generates the first wait signal at the control terminal of the first power converter.

21. The apparatus of clause 19, wherein the first signaling circuit is further to increase the voltage at the control terminal of the first power converter above the fault threshold to a wait threshold after the timer circuit outputs the time elapsed signal.

22. The apparatus of clause 19, wherein the first fault protection circuit is further to change the operating mode of the second power converter from a wait mode to a normal mode after the timer circuit outputs the time elapsed signal.

23. The apparatus of clause 19, wherein the first fault protection circuit is further to increase a voltage at the control terminal of the second power converter above the regulation threshold after the timer circuit outputs the time elapsed signal.

24. A fault handling method, comprising:
detecting, via a first detection circuit of a first power converter, a fault condition associated with the first power converter;
wherein the first power converter and a second power converter each include an output terminal and a control terminal, the first and second power converters to regulate voltage or current at their respective output terminals based on a voltage at their respective control terminals, the output terminals coupled to each other, and the control terminals coupled to each other;
generating, via a first signaling circuit of the first power converter, a first fault signal at the control terminal of the first power converter after the first detection circuit detects the fault condition associated with the first power converter;
changing, via a first fault protection circuit of the second power converter, an operating mode of the second power converter after the first signaling circuit generates the first fault signal at the control terminal of the first power converter.

25. The method of clause 24, wherein the first power converter and the second power converter are DC-DC converters.

26. The method of clause 25, wherein the first power converter and the second power converter are step-down converters.

27. The method of clause 26, wherein the first power converter and the second power converter are buck converters.

28. The method of clause 24, wherein an input of the first power converter and an input of the second power converter are coupled to each other.

29. The method of clause 24, wherein the fault condition is an over-temperature condition.

30. The method of clause 24, wherein the fault condition is an over-current condition.

31. The method of clause 24, further comprising:
sensing, via the first detection circuit, that a voltage at the control terminal of the first power converter is below a regulation threshold.

32. The method of clause 31, further comprising:
reducing, via the first signaling circuit, a voltage at the control terminal of the first power converter below a fault threshold after the first detection circuit senses that the voltage at the control terminal of the first power converter is below the regulation threshold.

33. The method of clause 32, further comprising:
changing, via the first fault protection circuit, the operating mode of the second power converter after the first signaling circuit reduces the voltage at the control terminal of the first power converter below the fault threshold.

34. The method of clause 33, further comprising:
changing, via the first fault protection circuit, the operating mode of the second power converter after the voltage at the control terminal of the second power converter reduces below the fault threshold.

35. The method of clause 34, further comprising:
changing, via the first fault protection circuit, the operating mode of the second power converter from a normal mode to a fault protection mode after the first signaling circuit reduces the voltage at the control terminal of the first power converter below the fault threshold.

36. The method of clause 35, further comprising:
reducing, via the first fault protection circuit, a voltage at the control terminal of the second power converter below the fault threshold after the first signaling circuit reduces the voltage at the control terminal of the first power converter below the fault threshold.

37. The method of clause 35, further comprising:
maintaining, via a supplemental regulation circuit of the second power converter, a voltage at the control terminal of the second power converter above the fault threshold but below a minimum normal operating voltage after the first signaling circuit reduces the voltage at the control terminal of the first power converter below the fault threshold.

38. The method of clause 36, further comprising:
activating a timer circuit of the second power converter after the first fault protection circuit reduces the voltage at the control terminal of the second power converter below the fault threshold; and
outputting, via the timer circuit, a time elapsed signal after a time period.

39. The method of clause 38, further comprising:
changing, via the first fault protection circuit, the operating mode of the second power converter after the timer circuit outputs the time elapsed signal.

40. The method of clause 39, further comprising:
changing, via the first fault protection circuit, the operating mode of the second power converter from a fault protection mode to a wait mode after the timer circuit outputs the time elapsed signal.

41. The method of clause 40, further comprising:
increasing, via the first fault protection circuit, the voltage at the control terminal of the second power converter above the fault threshold to a wait threshold after the timer circuit outputs the time elapsed signal.

42. The method of clause 32, further comprising:
activating a timer circuit of the first power converter after the first signaling circuit reduces the voltage at the control terminal of the first power converter below the fault threshold; and outputting, via the timer circuit, a time elapsed signal after a time period.

43. The method of clause 42, further comprising:
detecting, via the first detection circuit, disappearance of the fault condition associated with the first power converter after the timer circuit outputs the time elapsed signal;
generating, via the first signaling circuit, a first wait signal at the control terminal of the first power converter after the first detection circuit detects the disappearance of the fault condition associated with the first power converter; and
changing, via the first fault protection circuit, the operating mode of the second power converter after the first signaling circuit generates the first wait signal at the control terminal of the first power converter.

44. The method of clause 42, further comprising:
Increasing, via the first signaling circuit, the voltage at the control terminal of the first power converter above the fault threshold to a wait threshold after the timer circuit outputs the time elapsed signal.

45. The method of clause 42, further comprising:
changing, via the first fault protection circuit, the operating mode of the second power converter from a wait mode to a normal mode after the timer circuit outputs the time elapsed signal.

46. The method of clause 42, further comprising:
increasing, via the first fault protection circuit, a voltage at the control terminal of the second power converter above the regulation threshold after the timer circuit outputs the time elapsed signal.

47. An integrated circuit comprising:
a first controller and a second controller;
the first and second controller each including an output terminal and a control terminal, the first and second controllers to regulate voltage or current at their respective output terminals based on a voltage at their respective control terminals, the output terminals coupled to each other, and the control terminals coupled to each other;
wherein the first controller comprises:
a first detection circuit to detect a fault condition associated with the first controller, and
a first signaling circuit to generate a first fault signal at the control terminal of the first controller after the first detection circuit detects the fault condition associated with the first controller;
wherein the second controller comprises:
a first fault protection circuit to change an operating mode of the second controller after the first signaling circuit generates the first fault signal at the control terminal of the first controller.

48. The integrated circuit of clause 47, wherein the first controller and the second controller are DC-DC converters.

49. The integrated circuit of clause 48, wherein the first controller and the second controller are step-down converters.

50. The integrated circuit of clause 49, wherein the first controller and the second controller are buck converters.

51. The integrated circuit of clause 47, wherein an input of the first controller and an input of the second controller are coupled to each other.

52. The integrated circuit of clause 47, wherein the fault condition is an over-temperature condition.

53. The integrated circuit of clause 47, wherein the fault condition is an over-current condition.

54. The integrated circuit of clause 47, wherein the first detection circuit is to sense that a voltage at the control terminal of the first controller is below a regulation threshold.

55. The integrated circuit of clause 54, wherein the first signaling circuit is to reduce a voltage at the control terminal of the first controller below a fault threshold after the first detection circuit senses that the voltage at the control terminal of the first controller is below the regulation threshold.

56. The integrated circuit of clause 55, wherein the first fault protection circuit is to change the operating mode of the second controller after the first signaling circuit reduces the voltage at the control terminal of the first controller below the fault threshold.

57. The integrated circuit of clause 56, wherein the first fault protection circuit is further to change the operating mode of the second controller after the voltage at the control terminal of the second controller reduces below the fault threshold.

58. The integrated circuit of clause 57, wherein the first fault protection circuit is to change the operating mode of the second controller from a normal mode to a fault protection mode after the first signaling circuit reduces the voltage at the control terminal of the first controller below the fault threshold.

59. The integrated circuit of clause 58, wherein the first fault protection circuit is to reduce a voltage at the control terminal of the second controller below the fault threshold after the first signaling circuit reduces the voltage at the control terminal of the first controller below the fault threshold.

60. The integrated circuit of clause 58, wherein the second controller further comprises a supplemental regulation circuit to maintain a voltage at the control terminal of the second controller above the fault threshold but below a minimum normal operating voltage after the first signaling circuit reduces the voltage at the control terminal of the first controller below the fault threshold.

61. The integrated circuit of clause 59, wherein the second controller further comprises a timer circuit, the timer circuit to be activated after the first fault protection circuit reduces the voltage at the control terminal of the second controller below the fault threshold, the timer circuit further to output a time elapsed signal after a time period.

62. The integrated circuit of clause 61, the first fault protection circuit is further to change the operating mode of the second controller after the timer circuit outputs the time elapsed signal.

63. The integrated circuit of clause 62, wherein the first fault protection circuit is to change the operating mode of the second controller from a fault protection mode to a wait mode after the timer circuit outputs the time elapsed signal.

64. The integrated circuit of clause 63, wherein the first fault protection circuit is to increase the voltage at the control terminal of the second controller above the fault threshold to a wait threshold after the timer circuit outputs the time elapsed signal.

65. The integrated circuit of clause 55, wherein the first controller further comprises a timer circuit, the timer circuit to activate after the first signaling circuit reduces the voltage at the control terminal of the first controller below the fault threshold, the timer circuit further to output a time elapsed signal after a time period.

66. The integrated circuit of clause 65, wherein:
the first detection circuit is further to detect disappearance of the fault condition associated with the first controller after the timer circuit outputs the time elapsed signal;
the first signaling circuit is further to generate a first wait signal at the control terminal of the first controller after the first detection circuit detects the disappearance of the fault condition associated with the first controller; and
the first fault protection circuit is further to change the operating mode of the second controller after the first signaling circuit generates the first wait signal at the control terminal of the first controller.

67. The integrated circuit of clause 65, wherein the first signaling circuit is further to increase the voltage at the control terminal of the first controller above the fault threshold to a wait threshold after the timer circuit outputs the time elapsed signal.

68. The integrated circuit of clause 65, wherein the first fault protection circuit is further to change the operating mode of the second controller from a wait mode to a normal mode after the timer circuit outputs the time elapsed signal.

69. The integrated circuit of clause 65, wherein the first fault protection circuit is further to increase a voltage at the control terminal of the second controller above the regulation threshold after the timer circuit outputs the time elapsed signal.

70. A fault handling apparatus, comprising:
a plurality of power converters, the power converters each including an output terminal and a control terminal, the power converters to regulate voltage or current at their respective output terminals based on a voltage at their respective control terminals, the output terminals coupled to each other, and the control terminals coupled to each other at a common node;
wherein each power converter comprises:
  a detection circuit to detect a fault condition associated with the power converter,
  a signaling circuit to reduce a voltage of its control terminal below a fault threshold after detecting the fault condition associated with the power converter, and
  a fault protection circuit to reduce a voltage of its control terminal below a wait threshold after sensing a voltage decrease at the common node.

71. The apparatus of clause 70, wherein the power converters are DC-DC converters.

72. The apparatus of clause 71, wherein the power converters are step-down converters.

73. The apparatus of clause 72, wherein the power converters are buck converters.

74. The apparatus of clause 70, the power converters each including an input terminal, the input terminals coupled to each other.

75. The apparatus of clause 70, wherein the fault condition is an over-temperature condition.

76. The apparatus of clause 70, wherein the fault condition is an over-current condition.

77. The apparatus of clause 70, wherein the detection circuit is to sense that a voltage at the control terminal of the power converter is below a regulation threshold.

78. The apparatus of clause 70, wherein each power converter further comprises:
  a timer circuit, the timer circuit to be activated after the voltage of the power converter's control terminal reduces below either the fault threshold or the wait threshold, the timer circuit further to output a time elapsed signal after a time period.

79. The apparatus of clause 78, wherein:
  the detection circuit is further to detect disappearance of the fault condition associated with the power converter after the timer circuit outputs the time elapsed signal,
  the signaling circuit is further to increase the voltage of the power converter's control terminal above the fault threshold to a wait threshold after the detection circuit detects the disappearance of the fault condition associated with the power converter, and
  the fault protection circuit is further to increase the voltage of the power converter's control terminal to above a regulation threshold after sensing a voltage increase at the common node to above a wait threshold, and after the timer circuit outputs the time elapsed signal.

80. In a fault handling apparatus including a plurality of power converters, the power converters each including a detection circuit, a signaling circuit, a fault protection circuit, an output terminal, and a control terminal, the output terminals coupled to each other, and the control terminals coupled to each other at a common node, a method comprising:
regulating, via the power converters, voltage or current at their respective output terminals based on a voltage at their respective control terminals;
detecting, via the detection circuit of one of the power converters, a fault condition associated with the power converter;
reducing, via the signaling circuit of the one of the power converters, a voltage of its control terminal below a fault threshold after detecting the fault condition associated with the power converter, and
reducing, via the fault protection circuit of one of the other power converters, a voltage of its control terminal below a wait threshold after sensing a voltage decrease at the common node.

81. The method of clause 80, wherein the power converters are DC-DC converters.

82. The method of clause 81, wherein the power converters are step-down converters.

83. The method of clause 82, wherein the power converters are buck converters.

84. The method of clause 80, wherein the power converters each include an input terminal, the input terminals coupled to each other.

85. The method of clause 80, wherein the fault condition is an over-temperature condition.

86. The method of clause 80, wherein the fault condition is an over-current condition.

87. The method of clause 80, further comprising:
sensing, via the first detection circuit of the one of the power converters, that a voltage at the control terminal of the power converter is below a regulation threshold.

88. The method of clause 80, further comprising:
activating a timer circuit of the one of the power converters after the voltage of the power converter's control terminal reduces below either the fault threshold or the wait threshold; and
outputting, via the timer circuit, a time elapsed signal after a time period.

89. The method of clause 88, further comprising:
detecting, via the detection circuit of the one of the power converters, disappearance of the fault condition associated with the power converter after the timer circuit outputs the time elapsed signal;
increasing, via the signaling circuit of the one of the power converters, the voltage of the power converter's control terminal above the fault threshold to a wait threshold after the detection circuit detects the disappearance of the fault condition associated with the power converter; and
increasing, via the fault protection circuit of the one of the other power converters, the voltage of the power converter's control terminal to above a regulation threshold after sensing a voltage increase at the common node to above a wait threshold, and after the timer circuit outputs the time elapsed signal.

90. An integrated circuit, comprising:
a plurality of controllers, the controllers each including an output terminal and a control terminal, the controllers to regulate voltage or current at their respective output terminals based on a voltage at their respective control terminals, the output terminals coupled to each other, and the control terminals coupled to each other at a common node;

wherein each controller comprises:
- a detection circuit to detect a fault condition associated with a power converter,
- a signaling circuit to reduce a voltage of its control terminal below a fault threshold after detecting the fault condition associated with the power converter, and
- a fault protection circuit to reduce a voltage of its control terminal below a wait threshold after sensing a voltage decrease at the common node.

91. The integrated circuit of clause 90, wherein the plurality of controllers are part of a first power converter and a second power converter, wherein the first power converter and the second power converter are DC-DC converters.

92. The integrated circuit of clause 91, wherein the first power converter and the second power converter are step-down converters.

93. The integrated circuit of clause 92, wherein the first power converter and the second power converter are buck converters.

94. The integrated circuit of clause 90, the power converter including an input terminal, the input terminals coupled to each other.

95. The integrated circuit of clause 90, wherein the fault condition is an over-temperature condition.

96. The integrated circuit of clause 90, wherein the fault condition is an over-current condition.

97. The integrated circuit of clause 90, wherein the first detection circuit is to sense that a voltage at the control terminal of the power converter is below a regulation threshold.

98. The integrated circuit of clause 90, wherein the power converter further comprises:
- a timer circuit, the timer circuit to be activated after the voltage of the power converter's control terminal reduces below either the fault threshold or the wait threshold, the timer circuit further to output a time elapsed signal after a time period.

99. The integrated circuit of clause 98, wherein:
- the detection circuit is further to detect disappearance of the fault condition associated with the power converter after the timer circuit outputs the time elapsed signal,
- the signaling circuit is further to increase the voltage of the power converter's control terminal above the fault threshold to a wait threshold after the detection circuit detects the disappearance of the fault condition associated with the power converter, and
- the fault protection circuit is further to increase the voltage of the power converter's control terminal to above a regulation threshold after sensing a voltage increase at the common node to above a wait threshold, and after the timer circuit outputs the time elapsed signal.

What is claimed is:

1. A fault handling apparatus comprising:
a first power converter and a second power converter;
the first and second power converters each including an output terminal and a control terminal, the first and second power converters to regulate voltage or current at their respective output terminals based on a voltage at their respective control terminals, the output terminals coupled to each other, and the control terminals coupled to each other;

wherein the first power converter comprises:
- a first detection circuit to detect a fault condition associated with the first power converter, and
- a first signaling circuit to generate a first fault signal at the control terminal of the first power converter after the first detection circuit detects the fault condition associated with the first power converter;

wherein the second power converter comprises:
- a first fault protection circuit to change an operating mode of the second power converter after the first signaling circuit generates the first fault signal at the control terminal of the first power converter.

2. The apparatus of claim 1, wherein the first detection circuit is to sense that a voltage at the control terminal of the first power converter is below a regulation threshold.

3. The apparatus of claim 2, wherein the first signaling circuit is to reduce a voltage at the control terminal of the first power converter below a fault threshold after the first detection circuit senses that the voltage at the control terminal of the first power converter is below the regulation threshold.

4. The apparatus of claim 3, wherein the first fault protection circuit is to change the operating mode of the second power converter after the first signaling circuit reduces the voltage at the control terminal of the first power converter below the fault threshold.

5. The apparatus of claim 4, wherein the first fault protection circuit is further to change the operating mode of the second power converter after the voltage at the control terminal of the second power converter reduces below the fault threshold.

6. The apparatus of claim 5, wherein the first fault protection circuit is to change the operating mode of the second power converter from a normal mode to a fault protection mode after the first signaling circuit reduces the voltage at the control terminal of the first power converter below the fault threshold.

7. The apparatus of claim 6, wherein the first fault protection circuit is to reduce a voltage at the control terminal of the second power converter below the fault threshold after the first signaling circuit reduces the voltage at the control terminal of the first power converter below the fault threshold.

8. The apparatus of claim 6, wherein the second power converter further comprises a supplemental regulation circuit to maintain a voltage at the control terminal of the second power converter above the fault threshold but below a minimum normal operating voltage after the first signaling circuit reduces the voltage at the control terminal of the first power converter below the fault threshold.

9. The apparatus of claim 7, wherein the second power converter further comprises a timer circuit, the timer circuit to be activated after the first fault protection circuit reduces the voltage at the control terminal of the second power converter below the fault threshold, the timer circuit further to output a time elapsed signal after a time period.

10. The apparatus of claim 9, the first fault protection circuit is further to change the operating mode of the second power converter after the timer circuit outputs the time elapsed signal.

11. The apparatus of claim 10, wherein the first fault protection circuit is to change the operating mode of the second power converter from a fault protection mode to a wait mode after the timer circuit outputs the time elapsed signal.

12. A fault handling method, comprising:
   detecting, via a first detection circuit of a first power converter, a fault condition associated with the first power converter;
   wherein the first power converter and a second power converter each include an output terminal and a control terminal, the first and second power converters to regulate voltage or current at their respective output terminals based on a voltage at their respective control terminals, the output terminals coupled to each other, and the control terminals coupled to each other;
   generating, via a first signaling circuit of the first power converter, a first fault signal at the control terminal of the first power converter after the first detection circuit detects the fault condition associated with the first power converter;
   changing, via a first fault protection circuit of the second power converter, an operating mode of the second power converter after the first signaling circuit generates the first fault signal at the control terminal of the first power converter.

13. The method of claim 12, further comprising:
   sensing, via the first detection circuit, that a voltage at the control terminal of the first power converter is below a regulation threshold.

14. The method of claim 13, further comprising:
   reducing, via the first signaling circuit, a voltage at the control terminal of the first power converter below a fault threshold after the first detection circuit senses that the voltage at the control terminal of the first power converter is below the regulation threshold.

15. The method of claim 14, further comprising:
   changing, via the first fault protection circuit, the operating mode of the second power converter after the first signaling circuit reduces the voltage at the control terminal of the first power converter below the fault threshold.

16. The method of claim 15, further comprising:
   changing, via the first fault protection circuit, the operating mode of the second power converter after the voltage at the control terminal of the second power converter reduces below the fault threshold.

17. The method of claim 16, further comprising:
   changing, via the first fault protection circuit, the operating mode of the second power converter from a normal mode to a fault protection mode after the first signaling circuit reduces the voltage at the control terminal of the first power converter below the fault threshold.

18. The method of claim 17, further comprising:
   reducing, via the first fault protection circuit, a voltage at the control terminal of the second power converter below the fault threshold after the first signaling circuit reduces the voltage at the control terminal of the first power converter below the fault threshold.

19. The method of claim 17, further comprising:
   maintaining, via a supplemental regulation circuit of the second power converter, a voltage at the control terminal of the second power converter above the fault threshold but below a minimum normal operating voltage after the first signaling circuit reduces the voltage at the control terminal of the first power converter below the fault threshold.

20. The method of claim 18, further comprising:
   activating a timer circuit of the second power converter after the first fault protection circuit reduces the voltage at the control terminal of the second power converter below the fault threshold; and
   outputting, via the timer circuit, a time elapsed signal after a time period.

21. The method of claim 20, further comprising:
   changing, via the first fault protection circuit, the operating mode of the second power converter after the timer circuit outputs the time elapsed signal.

22. The method of claim 21, further comprising:
   changing, via the first fault protection circuit, the operating mode of the second power converter from a fault protection mode to a wait mode after the timer circuit outputs the time elapsed signal.

* * * * *